United States Patent
Nguyen et al.

(10) Patent No.: US 10,191,959 B1
(45) Date of Patent: Jan. 29, 2019

(54) VERSIONED READ-ONLY SNAPSHOTS OF SHARED STATE IN DISTRIBUTED COMPUTING ENVIRONMENTS

(75) Inventors: Long X. Nguyen, Seattle, WA (US); Allan H. Vermeulen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1288 days.

(21) Appl. No.: 13/528,301

(22) Filed: Jun. 20, 2012

(51) Int. Cl.
*G06F 17/30* (2006.01)

(52) U.S. Cl.
CPC .. *G06F 17/30578* (2013.01); *G06F 17/30575* (2013.01)

(58) Field of Classification Search
CPC ..... H04L 29/00; H04L 49/103; H04L 49/108; G06F 15/00; G06F 11/2043
USPC ........................................................ 709/213
See application file for complete search history.

(56) References Cited

U.S. PATENT DOCUMENTS

| | | |
|---|---|---|
| 4,665,520 A | 5/1987 | Strom et al. |
| 5,212,788 A | 5/1993 | Lomet et al. |
| 5,261,085 A | 11/1993 | Lamport |
| 5,301,309 A | 4/1994 | Sugano |
| 5,553,239 A | 9/1996 | Heath et al. |
| 5,802,267 A | 9/1998 | Shirakihara et al. |
| 5,845,292 A | 12/1998 | Bohannon et al. |
| 5,923,832 A | 7/1999 | Shirakihara et al. |
| 6,078,930 A | 6/2000 | Lee et al. |
| 6,105,148 A | 8/2000 | Chung et al. |
| 6,169,991 B1 | 1/2001 | Tsukahara |
| 6,332,200 B1 | 12/2001 | Meth et al. |
| 6,374,243 B1 | 4/2002 | Kobayashi et al. |
| 6,516,350 B1 | 2/2003 | Lumelsky et al. |
| 6,651,142 B1 * | 11/2003 | Gorelik et al. ............... 711/119 |
| 7,249,280 B2 | 7/2007 | Lamport et al. |
| 7,426,653 B2 | 8/2008 | Hu et al. |
| 7,577,690 B2 | 8/2009 | Chandrasekaran et al. |
| 7,624,047 B1 | 11/2009 | Round |

(Continued)

OTHER PUBLICATIONS

R. M. Yoo, A. Romano and C. Kozyrakis, "Phoenix rebirth: Scalable MapReduce on a large-scale shared-memory system," 2009 IEEE International Symposium on Workload Characterization (IISWC), Austin, TX, 2009, pp. 198-207.*

(Continued)

*Primary Examiner* — Oscar A Louie
*Assistant Examiner* — Messeret F Gebre
(74) *Attorney, Agent, or Firm* — Robert C. Kowert; Meyertons, Hood, Kivlin, Kowert & Goetzel, P.C.

(57) ABSTRACT

Methods and apparatus for versioned read-only snapshots of shared state for distributed applications are disclosed. A distributed system includes a state manager implementing programmatic interfaces defining caching operations. In response to a cache setup request from a process of a distributed client application, the state manager designates elements of a registry as a cache data set, and provides the client process a reference to an asynchronously updated cache object. The state manager initiates a sequence of asynchronous update notifications to the cache object, wherein each notification includes (a) updated contents of an element of the cache data set, and (b) a cache version identifier based at least in part on a registry logical timestamp value indicative of a time at which the element was updated.

23 Claims, 20 Drawing Sheets

(56) References Cited

U.S. PATENT DOCUMENTS

| | | | |
|---|---|---|---|
| 7,773,522 | B2 | 8/2010 | Chafle et al. |
| 7,783,610 | B2 | 8/2010 | Lin et al. |
| 7,792,980 | B2 | 9/2010 | Eshel et al. |
| 7,925,782 | B2 | 4/2011 | Sivasubramanian et al. |
| 7,937,616 | B2 | 5/2011 | Armstrong et al. |
| 8,006,124 | B2 | 8/2011 | Park et al. |
| 8,037,186 | B2 | 10/2011 | Dumitriu et al. |
| 8,046,763 | B1 | 10/2011 | Czajkowski et al. |
| 8,073,941 | B2 | 12/2011 | Binyamin |
| 8,108,712 | B1 | 1/2012 | Carlino et al. |
| 8,108,733 | B2 | 1/2012 | Richmond |
| 8,122,098 | B1 | 2/2012 | Richardson et al. |
| 8,271,437 | B2 | 9/2012 | Arcese et al. |
| 8,321,568 | B2 | 11/2012 | Sivasubramanian et al. |
| 2001/0033555 | A1 | 10/2001 | Kim et al. |
| 2002/0188605 | A1* | 12/2002 | Adya et al. .................. 707/4 |
| 2003/0088625 | A1* | 5/2003 | Berkowitz ........ G06F 17/30371 709/205 |
| 2003/0088659 | A1* | 5/2003 | Susarla ............... H04L 29/06 709/223 |
| 2005/0028160 | A1 | 2/2005 | Cofer et al. |
| 2005/0120061 | A1* | 6/2005 | Kraft ......................... 707/203 |
| 2005/0165758 | A1* | 7/2005 | Kasten et al. ................ 707/3 |
| 2006/0064545 | A1* | 3/2006 | Wintergerst ............... 711/130 |
| 2006/0136781 | A1 | 6/2006 | Lamport |
| 2006/0179059 | A1 | 8/2006 | Reed et al. |
| 2006/0206534 | A1* | 9/2006 | Banks et al. ............... 707/200 |
| 2006/0221720 | A1* | 10/2006 | Reuter .................. G06F 3/0605 365/189.05 |
| 2006/0259637 | A1* | 11/2006 | Yadav ............... G06F 17/30902 709/231 |
| 2007/0174541 | A1 | 7/2007 | Chandrasekaran et al. |
| 2008/0177830 | A1 | 7/2008 | Vo et al. |
| 2008/0208938 | A1 | 8/2008 | Lin et al. |
| 2009/0177914 | A1 | 7/2009 | Winchell |
| 2009/0287720 | A1 | 9/2009 | Herter et al. |
| 2009/0271794 | A1* | 10/2009 | Zoll et al. .................. 718/103 |
| 2009/0327292 | A1* | 12/2009 | Janssen et al. ................ 707/8 |
| 2009/0327807 | A1 | 12/2009 | Varadarajan et al. |
| 2010/0023521 | A1 | 1/2010 | Arcese et al. |
| 2010/0161573 | A1 | 6/2010 | Chan et al. |
| 2011/0078123 | A1* | 3/2011 | Busch ................... G06F 9/466 707/690 |
| 2011/0106778 | A1 | 5/2011 | Chan et al. |
| 2012/0259821 | A1* | 10/2012 | Alam ........................... 707/692 |
| 2012/0271795 | A1* | 10/2012 | Rao et al. ................... 707/613 |

OTHER PUBLICATIONS

K. Ekanadham, Beng-Hong Lim, P. Pattnaik and M. Snir, "PRISM: an integrated architecture for scalable shared memory," Proceedings 1998 Fourth International Symposium on High-Performance Computer Architecture, Las Vegas, NV, USA, 1998, pp. 140-151.*

Talbot, Justin, "Modular MapReduce for shared-memory systems", Proceedings of the second internal workshop on MapReduce and its applications, 2011, pp. 9-16.*

Narasimhan, Lakshmi, "Design and evaluation of a dual-microcomputer shared memory system with a shared I/O bus", vol. 10, Issue 1, 1986, pp. 3-10.*

"Future (Java 2 Platform SE 5.0)," 2004/2010 Oracle and/or its Affiliates, downloaded from docs.oracle.com/jayase/1.5.0/docs/api/jaya/util/concurrent/Future.html, pp. 1-4.

U.S. Appl. No. 13/528,271, filed Jun. 20, 2012, Long X. Nguyen.

U.S. Appl. No. 13/528,249, filed Jun. 20, 2012, Long X. Nguyen, et al.

U.S. Appl. No. 13/528,340, filed Jun. 20, 2012, Long X. Nguyen.

U.S. Appl. No. 12/771,840, filed Apr. 30, 2010, Allan H. Vermeulen, et al.

U.S. Appl. No. 12/887,042, filed Sep. 21, 2010, Allan H. Vermeulen, et al.

U.S. Appl. No. 12/771,851, filed Apr. 30, 2010, Allan H. Vermeulen, et al.

"Restoring Consistent Global States of Distributed Computations," Goldberg, et al., 1991 ACM, pp. 1-11.

"The Chubby lock service for loosely-coupled distributed systems," Mike Burrows, Google, Inc., pp. 335-350 Year of Publication: 2006, ISBN:1-931971-47-1.

"Transparent Checkpoint-Restart of Distributed Applications on Commodity Clusters," Laaden, et al., Appears in Proceedings of the 2005 IEEE International Conference on Cluster Computing (Cluster 2005), Boston, MA, Sep. 26-30, 2005.

"Distributed Checkpointing: Analysis and Benchmarks," Gustavo M. D. Vieira and Luiz E. Buzato, Partially supported by CAPES under grant No. 01P-15081/1997, pp. 1-16.

"Paxos Made Live—An Engineering Perspective," Chandra, et al., Jun. 20, 2007, pp. 1-16.

"Paxos Made Simple," Leslie Lamport, Nov. 1, 2001., pp. 1-14.

* cited by examiner

VERSIONED READ-ONLY SNAPSHOTS OF SHARED STATE IN DISTRIBUTED COMPUTING ENVIRONMENTS

BACKGROUND

Implementing computing systems that manage large quantities of data and/or service large numbers of users often presents problems of scale. For example, as demand for various types of computing services grows, it may become difficult to service that demand without increasing the available computing resources accordingly. To facilitate scaling in order to meet demand, a particular computing service might be implemented as a distributed application that executes on a number of instances of computing hardware. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data that they would ordinarily coordinate access to).

More generally, the larger the distributed system, the more difficult it may be to coordinate the actions of various actors within the system (e.g., owing to the difficulty of ensuring that many different actors that are potentially widely distributed have a consistent view of system state). Depending on the granularity at which state information is shared among different components of distributed systems, the networking and computation overheads associated with sharing state information using traditional techniques such as polling may potentially grow to unsustainable levels. Problems may also arise in distributed systems as a result of the way remotely executed tasks may get re-ordered—e.g., one component of a distributed application may submit respective requests for a set of operations in a certain order, but the requests may not be handled by a remote server in the same order.

Figure 1:
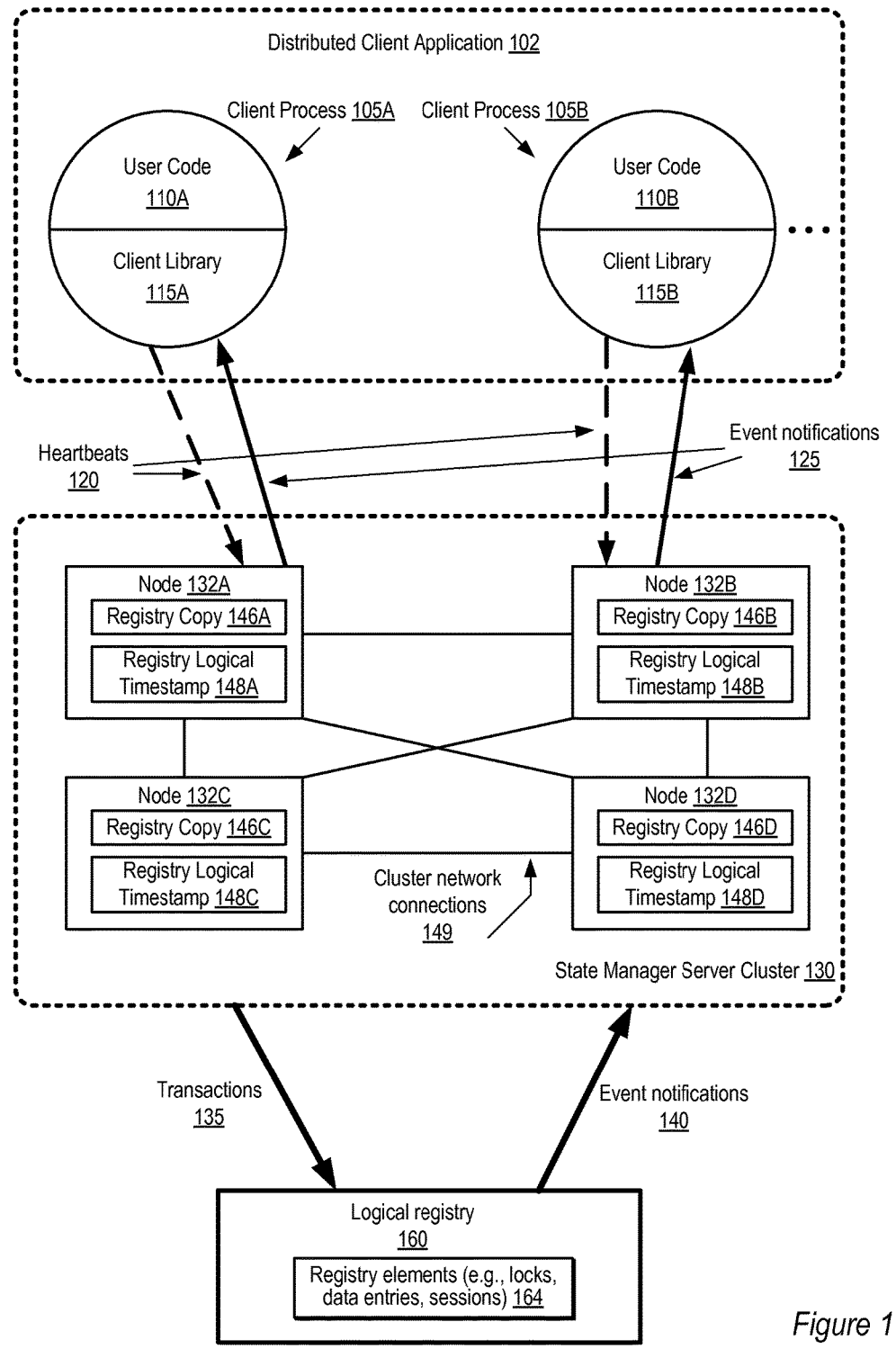
FIG. 1 illustrates various components of an example distributed state manager, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for supporting application state management in a distributed system are described, including for example techniques for asynchronous and idempotent locking of state information, establishing reliable and efficient watch mechanisms for state change notification, and versioned read-only snapshots of shared state. Distributed software applications may comprise multiple concurrent and often autonomous processes, communicating with one another and/or with shared resources across one or more networks. For example, a distributed computing application or a distributed storage service may include multiple concurrent processes. Various ones of these processes may be executing on different physical and/or logical (e.g., virtual) resources or platforms at any given time, and the number of resources involved in the application or service may change over time. In a distributed storage service, for example, processes (e.g., software servers) on different machines may each expose a programmatic interface to clients, which the clients may use to access a single, virtual file system that may be implemented across multiple storage resources.

In order for the concurrent processes of a distributed application to cooperate successfully, it may sometimes be necessary for one or more of the processes to gain exclusive access to a given shared resource for a given period of execution. The shared resource may include, for example, administrative or data state information of the distributed application. In one example scenario, a distributed application may store group membership records in a shared repository, such as a respective record for each currently-running "worker" node of the application. If one or more worker nodes fail or lose communication with the other nodes, corrective action may need to be taken (such as adding replacement worker nodes, and/or initiating repair of the failed nodes). Initiating the corrective actions may itself be a distributed function—e.g., any of a number of monitoring nodes or processes may be able to initiate the corrective actions. In order to perform the corrective actions effectively (e.g., to avoid duplicating corrective actions), a consistent view of the group membership records may be required for the monitoring nodes. In addition to administrative information, application data for distributed applications may also require consistency mechanisms. For example, a given process may require exclusive read and/or write access to a shared file, database, database entry, variable, and/or various other shared data in order to perform a series of accesses to the shared data atomically with respect to the other concurrent processes of the distributed application.

To facilitate consistent sharing of administrative and/or data state among the multiple concurrent processes of a distributed application, the distributed application may employ the services of a state manager (SM). A state manager may implement a repository or registry in which various types of state information of the distributed application may be stored. Each of the constituent processes of the distributed application may be deemed a client process of the state manager in some embodiments. The term "client" may be used synonymously with the term "client process" herein. Each client process may interact with the state manager to update various elements of the state information, and to coordinate access to state information shared with other constituent processes. In some embodiments, the state manager may support a number of different types of locking operations, allowing client processes to request locks on desired elements of state information, and ensure that each lock is held by at most one client process of the distributed application at any given time. For example, the registry may be used to store indications of each lock and the identity of a process (if any) that is currently holding the lock. In various embodiments, the registry may also contain other types of elements, such as lockable data entries (i.e., software objects containing data values representing shared state information) and/or session objects representing currently active interactions between the client processes and the state manager. A session object may be used, for example, to track the most recent time a communication was received from a particular client process, and may thus serve as an indicator of the health state of the client process. In some embodiments, locks may be advisory, in that the state manager may not actually attempt to enforce locks. Instead, the state manager may rely upon client processes to cooperate with one another and to respect lock semantics. To perform various access operations (e.g., reads, writes) to shared resources such as data entries and/or session elements of the registry, a client process may first acquire the shared resource's respective lock in some embodiments.

In different embodiments, the client processes of a distributed application may adhere to various locking protocols. For example, in some embodiments, processes not holding a given lock may only access resources associated with that lock in a read-only manner, while in other embodiments, a process may be forbidden from accessing shared resources at all unless the process holds the lock associated with that shared resource. In various embodiments, the state manager may be configured to dispense read-locks, write-locks, read/write locks, and/or various other types of locks to facilitate various locking protocols.

In some embodiments, at least a portion of a state manager may itself be implemented as multiple processes or nodes executing across multiple systems as a distributed state manager application. Such a state manager may be referred to herein as a distributed state manager (DSM). A DSM may provide various benefits over a non-distributed state manager, such as higher availability and/or throughput. For example, a DSM implemented on a cluster of computers may allow a client process to interact with any of a plurality of the computers in order to acquire and/or release locks. Thus, the DSM may be more resilient in case of a hardware and/or software malfunction. Additionally, a DSM may facilitate higher throughput of lock acquisition/release operations by utilizing collective resources from multiple machines. In addition to locking-related functions, a DSM may also provide a number of other types of functions in some embodiments, such as, for example, monitoring client application nodes, state information cache enablement, data transfers or replication, and the like. A state manager that is used mainly or exclusively for its locking functionality may be referred to as a lock manager, and a DSM that is used mainly or exclusively for its locking functionality may be referred to as a distributed lock manager or DLM. A number of different types of computing devices may be used singly or in combination to implement the nodes of a DSM in different embodiments, including general purpose or special purpose computer servers, storage devices, networking devices and the like. The repository in which state information is stored may be implemented using a number of different techniques in various embodiments, including for example as a logical or virtual object managed collectively by the nodes of the DSM in some embodiments, as described below in further detail.

In at least some embodiments, client processes may interact with the nodes of a DSM using client-side library components of the DSM—e.g., libraries that may be installable on computing devices where the client processes run, and that expose state management application programming interfaces or APIs supported by the DSM. In such embodiments, the nodes of the DSM, to which communication from the client processes may be enabled via the client-side library components, may be referred to as "server" nodes of the DSM. A DSM may thus comprise server-side nodes as well as client-side library components in some embodiments. The server nodes of a DSM may use various protocols (such as consensus-based protocols in which a plurality of server nodes collectively make decisions) to ensure that updates to state information from various client processes are managed appropriately, as also described below in further detail.

According to at least one embodiment, a DSM may implement a set of programmatic interfaces such as application programming interfaces (APIs) defining various types of asynchronous locking operations accessible to the client processes. One of the interfaces in such an embodiment may allow a client process that wishes to acquire a lock on a registry element to submit one of at least two different types of requests to the DSM—a queue-for-lock (QFL) request, or a lock request. The queue-for-lock request may differ from the lock request in the number and manner of asynchronous notifications to the submitting client process in such an embodiment. In the case where a QFL request specifies a target registry element that is currently locked by some other client, the QFL submitter may be provided two distinct asynchronous notifications by the DSM: a first notification when (and if) a lock request on behalf of the submitter client process is successfully inserted in a queue of waiters for the lock on the target registry element, and a second notification when (and if) the submitting client is granted the lock. In at least some embodiments, each of the notifications may be provided after a consensus-based decision is reached by the server nodes—e.g., after a first decision as to whether to queue a lock request, the first notification may be provided, and after a second decision to grant the lock, the second notification may be provided. In the case of a straightforward lock request, in contrast, the submitter may only be notified when the lock is granted (and not when the lock request is queued). The two-step notification may be especially helpful for client processes that wish to ensure that lock cancellation (or release) requests are handled correctly and safely. For example, because of the distributed nature of the system, it may be in general possible for a lock cancellation request to be processed by the DSM before the corresponding lock request is actually queued (or granted); in such a case, the DSM may simply ignore the cancellation/release request, as it may determine that there is nothing to cancel or release. If the DSM ignores a release request and then later processes the lock request that the client process intended to cancel, the client process may proceed to do some operations assuming that it does not have the requested lock, when it actually has been granted the lock. This may lead to various problems, such as potential deadlock situations between different client processes. Being notified of the fact that its lock request was successfully queued (using the first notification received in response to a QFL request) may allow the client process to determine that it is now safe to submit a cancellation/release request, should the client process wish to submit such a request.

In at least some embodiments, a number of variations on the asynchronous locking operations such as queue-for-lock may be implemented. For example, in some implementations, if a client process already has a lock or is already queued for a lock, and submits another lock or QFL request for the same registry element, the DSM may normally return an error indication, e.g., by throwing an exception. In some embodiments, the DSM may support idempotent versions of the lock and/or queue-for-lock operations, which simply ignore such additional or duplicate lock requests, without providing error indications. In such embodiments, the client process code may be simplified by eliminating the need to respond to these kinds of error indications. In another variant, the DSM may support maximum queue lengths for specified locks—e.g., if a lock request (or a QFL request) specifying a desired maximum queue depth is received for a registry element for which no lock object currently exists, the DSM may create a lock object with the specified maximum queue depth in one embodiment. In such an embodiment, if a lock request is received later for the registry element, and the queue for the lock is full (i.e., the number of waiters equals the maximum queue depth), the lock request may be rejected by the DSM. Limiting lock queue depth in this fashion may be helpful in ensuring, for example, that client processes do not have to wait for excessive periods when locks are heavily contended, which may be useful for some types of applications. Further details regarding the different types of lock and QFL requests that may be supported in different embodiments are provided below.

For some types of distributed applications, it may be useful for the constituent processes of the applications to keep track of updates to portions of the application state information maintained in the registry. For example, for a distributed storage service, the registry may include mappings between storage object names and the storage devices on which the objects' data is located, and the mappings may change as data is modified by users of the distributed storage service, as storage devices fill up or are reorganized over time. In order to retrieve data from (or store data to) the right storage device, a client process implementing a portion of the distributed storage service may need the most recent set of mappings. A number of different approaches may be taken to keep the client processes up to date regarding registry updates. In some cases, the client processes may be responsible for polling the DSM to retrieve the latest version of the registry contents. However, polling-based approaches may not be very efficient, either computationally or in terms of the network traffic that may be generated. Accordingly, in some embodiments, the DSM may support a transactional watch mechanism allowing client processes to indicate registry elements of interest, and receive notifications when any of the elements are changed.

In at least one such embodiment, a client process may submit a watch establishment request (WER) to the DSM, comprising a specification of one or more target elements of the registry for which update notifications are to be provided and an indication of a notification destination (such as a queue created by the client process, or an executable notification handler set up by the client process). In response to the WER, the DSM may determine, based at least in part on a registry logical timestamp indicative of changes of the registry, a watch establishment timestamp value to be associated with the WER. In addition, the DSM may initiate a sequence of update notifications to the notification destination, corresponding to each update to the one or more target elements completed after the value of the registry logical timestamp reaches the watch establishment timestamp value, wherein (a) the order in which the update notifications of the sequence are provided to the notification destination matches the order in which the corresponding updates are applied to the one or more target elements (b) the sequence includes exactly one update notification for a given update to the one or more target elements and (c) the sequence excludes update notifications for elements of the registry other than the one or more target elements. The watch mechanism in such an embodiment may support at least four invariants, even in the presence of DSM node failures or network partitioning: validity (i.e., no updates are lost, and the client process is provided notifications of all committed updates), monotonicity (i.e., notifications for all updates are provided and processed in order), uniqueness (i.e., no update results in a duplicate notification), and selectivity (i.e., notifications for only the elements specified by the client process in the WER) are provided.

The DSM may also provide support for client-side, versioned, read-only snapshots or caches of designated registry elements in some embodiments. In one such embodiment, the DSM may implement a number of caching-related APIs defining operations to access a read-only cache of registry entries to be maintained on behalf of client processes. In response to a cache setup request from a particular client process, (e.g., via an API call), the DSM may designate one or more elements of the registry as a cache data set, and provide a reference to an asynchronously updated cache object comprising contents of the cache data set to the client process. The client process may be provided read-only access to the cache object in some embodiments, i.e., the client process may read registry elements from the cache, but may not write directly to the cache object; instead, any updates that the client wishes to make to the registry elements may be transmitted to the DSM, and the cache may be updated when and if the DSM commits the requested write. After the client process is provided the asynchronously updated cache object, the DSM may initiate a sequence of asynchronous update notifications to the particular client process, wherein each asynchronous update notification includes (a) updated contents of one or more elements of the cache data set, and (b) a cache version identifier based at least in part on a registry logical timestamp value indicative of a time at which the element was updated. Thus, once a cache is set up, the client process may be able to read registry contents from a consistent, automatically and efficiently updated cache, without having to for example establish any additional connections to the DSM server nodes. In some embodiments, the DSM may utilize the transactional watch mechanism described above to implement the read-only cache. In at least some embodiments, the registry may only support a limited set of object types, and as part of the cache functionality, the DSM may convert the registry objects to a data type specified by the client. A number of additional programmatic interfaces (e.g., various API methods) may be implemented for both the transactional watch mechanism and the versioned cache functionality. Further details regarding such interfaces, and about the watch and cache mechanisms in general, are provided below.

Example Distributed State Manager Environment

FIG. 1 illustrates various components of an example DSM, according to at least some embodiments. In the illustrated embodiment, the DSM comprises a server cluster 130 with a plurality of nodes 132 (e.g., 132A, 132B, 132C and 132D), as well as client library components 115 (e.g., 115A and 115B). Distributed client application 102 may comprise any program, or part of a program, that is configured to use a DSM for management of application state. Each distributed client application 102 may comprise a plurality of client processes 105 (e.g., 105A and 105B), each representing one or more threads of execution of the client application. For example, client processes 105 may represent respective nodes of a distributed storage service application that is configured to receive customer requests over a network and in response, perform various functions on behalf of those customers. In the illustrated embodiment, a client process 105 may comprise an execution of user code 110 and client library components 115. For example, client process 105A executes user code 110A and client library component 115A, and client process 105B executes user code 110B and client library components 115B. Different client processes may execute different user code and/or library components in some embodiments. A client library component 115 of the DSM may in some embodiments comprise a software library that exposes one or more programmatic interfaces to user code 110 for interacting with the DSM server cluster 130. In various embodiments, user code 110 of a client process 105 may invoke various methods of the client library component 115 to interact with the DSM server cluster 130 over a network, access different constants and/or variables of client library components 115, and/or otherwise access data and functionality of the client library components 115. In some embodiments, the client library components may read data from the DSM, update data in the DSM, and/or listen for events notifications 125 from the DSM.

According to the illustrated embodiment, a client process 105 may communicate with DSM server cluster 130 to, for example, submit asynchronous locking requests of various types, to establish and use transactional watch mechanisms, or to set up and receive notifications for versioned read-only caches, as described below in further detail. In some embodiments, each node 132 of the DSM server cluster may be implemented using a different physical and/or virtual machine. In other embodiments, two or more of nodes 132 may be different software instances or processes executing on the same physical or virtual machine. The set of server nodes 132 may be referred to as a "collective" in some embodiments.

A given client process 105 may communicate with the collective via one of the nodes 132 in the depicted embodiment. Different client processes may communicate with different nodes in some embodiments. The particular node 132 chosen by a client process 105 may depend on the identity of the client, the type of request, and/or other factors. In some embodiments, a client process 105 may maintain affinity to a given node 132 once communication and/or another relationship has been established. It may also be possible for a client process 105 that has established affinity with a first node 132 of the DSM collective to switch to another node at any time. This may be done arbitrarily, in response to a node failure, in response to the node becoming overloaded, in response to a scheduler component indicating that the client should switch to another node, and/or in response to various other events. As shown in the illustrated embodiment, the various nodes 132 may communicate with one another via network connections 149. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a DSM implemented on a fully-connected cluster of computers, where each node 132 is a different physical machine in the cluster, executes a separate instance of the DSM node software, and can communicate directly with every other node 132 in the collective via a network connection. However, those skilled in the art will appreciate that various other configurations are possible using different physical and/or virtual machines, connected by different network types and/or topologies, as described above.

According to FIG. 1, nodes 132 of the collective may work together to maintain a shared state, e.g., for various client applications, in a logical registry 160. The logical registry 160 may not necessarily be implemented as a separate physical entity, but rather, as a logical entity that may be implemented across multiple nodes 132 of the DSM. For example, in the depicted embodiment, each node 132 may keep a respective local copy 146 (e.g., local copy 146A for node 132A, local copy 146B for node 132B, and so on) of the logical registry 160. Through a consensus protocol, the nodes 132 may agree on state transitions for each node to apply to its local registry copy, thereby collectively maintaining a single logical registry 160. Each node 132 may thus maintain a cached copy of the registry that is valid as of the last registry transition (i.e., update) known at the node. In some embodiments, each transition may be associated with a registry logical timestamp, such as in a monotonically increasing 64-bit integer or counter agreed upon by the collective 130. This timestamp may be a physical or logical time in different embodiments, and may be referred to as the "DSM time" herein. In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. Each node 132 may maintain its own registry logical timestamp 148 (e.g., logical timestamp 148A for node 132A, logical timestamp 148B for node 132B, and so on), indicative of the most recent transition of the logical registry that is reflected in the local registry copy at that node. At any point in time, in some implementations, the value of the local logical registry timestamp 148 at a given node 132 may differ from the value of the local logical registry timestamp of another node; however, if and when two nodes have the same local logical registry timestamp values, the data in their respective local registry copies 146 may be identical (i.e., both local copies of the registry may be guaranteed to have applied the same set of updates). In at least some implementations, each node 132 may also maintain an independent system clock separate from the registry logical timestamps.

Logical registry 160 may include information that may be accessed in a consistent manner by a plurality of the nodes 132. In some embodiments, the logical registry 160 may include several types of elements and associated metadata, such as lock objects, data entries, session objects representing connections to client processes 105, and the like. Some or all of the registry elements may be used to represent application state of the distributed client applications 102. In some embodiments, the DSM may maintain multiple logical registries. In such embodiments, each logical registry may be identified by a unique name. Different logical registries may be used to store data relevant to a corresponding client application or set of client applications in some embodiments. For example, different distributed applications may use respective logical registries separate from one another. In other embodiments, a single logical registry may include elements representing state information of a plurality of client applications. In some embodiments, each of the elements of a given registry 160 (such as locks, data entries, and/or sessions) may be identified by a respective pathname (e.g., "registry1:/companyA/departmentB/objectC" within a namespace, e.g., each element may be identified via a string concatenated from substrings, where each substring represents a respective hierarchical component named using a directory-like naming convention, starting with a root substring (e.g., "registry1:" in the case of the element with the identifier "registry1:/companyA/departmentB/objectC").

Each lock managed using the logical registry 160 may be identified by a respective path in the registry namespace. The logical registry 160 may also include various data entries, each also identified with a respective path. Data entries may comprise information stored to the logical registry by client processes, such as information to be shared with other client processes. For example, when creating a lock, a client process 105 may wish to write some metadata describing the lock into a data entry. In some embodiments, such entries may include a name, value, creation time, and/or a modification time. The time-related information stored in the registry 160 (such as creation time, or modification time) may be expressed using DSM time in some embodiments, and/or using system clock time in other embodiments. In some embodiments, a logical registry may also list named client processes and/or client sessions (e.g., representations of connections between client processes 105 and the server cluster 130) recognized by the DSM. Such listings may also include configuration parameters for those client processes and/or sessions. For example, in some embodiments, a named client process may be alternatively listed as either registered, revoked, or forgotten.

The DSM server cluster 130 may act as a mediator between the client processes 105 and one or more logical registries 160. The client process 105 may interact with a logical registry 160 by submitting transactions to the DSM server cluster 130, which may interact with the logical registry 160 on behalf of the client process. Through a read transaction, a client process may read information such as locks, entries, or sessions from the logical registry 160. Using a write transaction, a client process 105 may update information in the logical registry 160. In some embodiments, the DSM server cluster may also execute "checks" or "check operations" on behalf of a client process. In a check operation, the DSM server cluster 130 may determine whether the context of a transaction that includes the check operation is what the client process expected. For example, optimistic writes may be implemented by checking that an entry has not been modified since a specified DSM time.

Each transaction may have different possible outcomes. In some embodiments, these outcomes may correspond to success-write, success-read, abort, and fail. A success-write outcome may indicate that a transaction that includes at least one write operation was executed successfully, any checks included in the transaction passed, and the registry has been updated. A success-read outcome may indicate that the transaction executed successfully but did not make any changes to the logical registry. An abort outcome may indicate that the transaction was aborted for some reason other than the particular contents of the transaction. In various embodiments, the DSM may abort and/or reattempt a transaction for different reasons. A fail outcome may indicate that the transaction failed, for example, because one or more checks in the transaction failed, a lock creation failed because the lock already exists, the request contained a syntax error, and/or for various other reasons.

The DSM may determine the outcome of various transactions and route event notifications (e.g., as indicated by the arrows labeled 125 in FIG. 1) indicating the outcomes to interested client processes 105. Client processes 105 may register to receive some or all events in some events in some embodiments, e.g., using the transactional watch mechanism described below in further detail. In some embodiments, the DSM may be configured to forward all event notifications to every client by default, but to allow each client to set up various filters to indicate the types of events in which it is interested. In some embodiments, each event notification 125 may be labeled with a physical and/or logical timestamp from which the client process 125 may be able to infer bounds on the age of the event.

As indicated above, in some embodiments client processes 105 may use transactions to read, insert, remove, and/or modify data stored in the logical registry 160. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client process.

In some embodiments, the DSM may execute a failure detection service to detect failures among different nodes 132. For example, if a given node 132 crashed or became otherwise unresponsive, the failure detection service may determine this. In some embodiments, a failure detection service may be executed across the server cluster 130 in a distributed manner. In some embodiments, the failure detection service may also determine whether particular client processes 105 have become unresponsive, for example, by monitoring heartbeat messages 120, from various client processes. In at least some embodiments, if connectivity is lost between a client process 105 and a given DSM node, the client library component 115 of the client process may automatically attempt to establish a connection to a different node. In at least some implementations, the client process may not be aware of the identity of the node to which it is connected.

Figure 2:
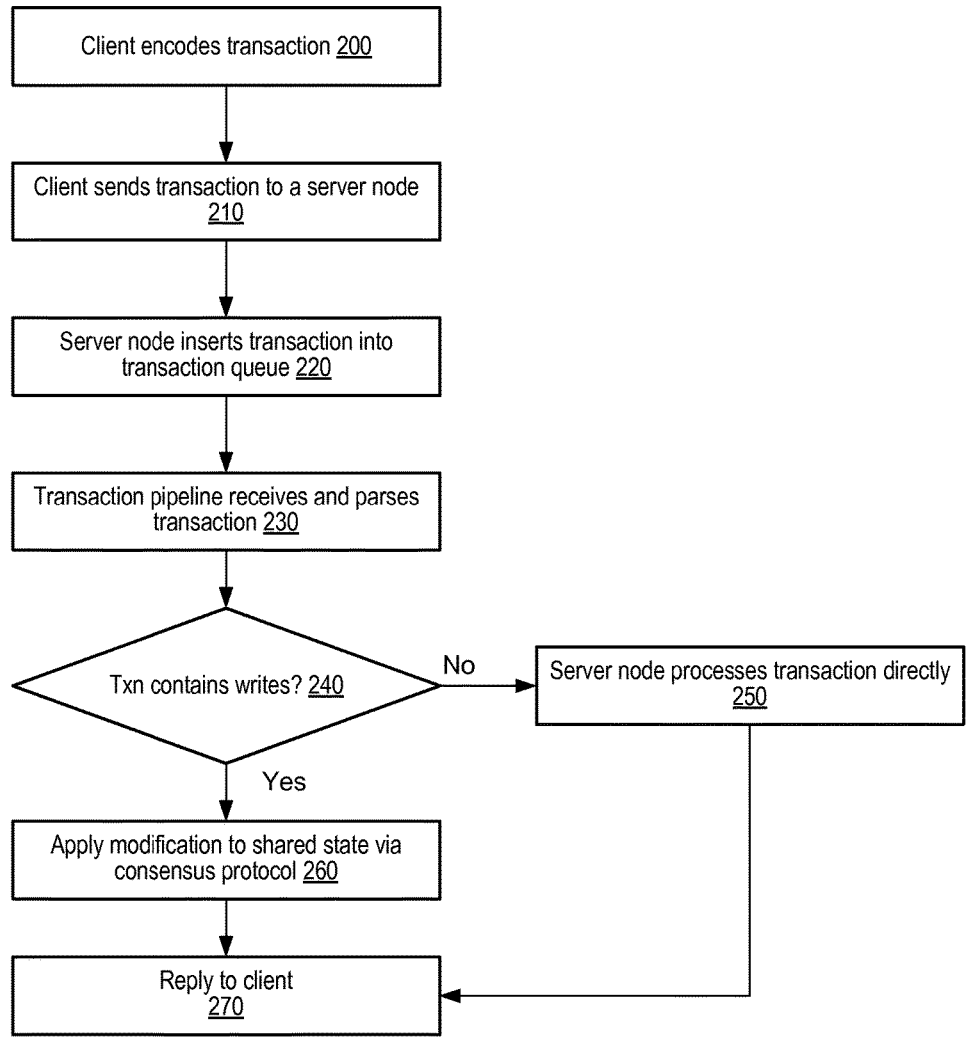
FIG. 2 is a flow diagram illustrating interactions between a client process and a distributed state manager collective to execute a transaction, according to at least some embodiments.

FIG. 2 is a flow diagram illustrating interactions between a client process 105 and a DSM collective 130 to execute a transaction, according to some embodiments. When a client process 105 determines to execute a given transaction on the logical registry 160 (e.g., to update the logical registry 160 to indicate that the client process has acquired a given lock), it may first encode the transaction, as indicated in element 200 of FIG. 2. For example, encoding the transaction may involve invoking one or more library functions of a client library component 115. In some embodiments, the transaction may be encoded using a stack-based transaction language, as described above. After creating the encoded transaction, the client process 105 may wrap the transaction in the body of a network message according to any suitable network protocol, and submit the wrapped transaction to a node 132 of the DSM server cluster, as shown in element 210. In some embodiments, the client process may contact any of a plurality of server cluster nodes 132 of the collective, e.g., in accordance with a node selection protocol.

Upon receiving the wrapped transaction, the node 132 may unwrap the message and insert the encoded transaction into a queue in a transaction pipeline, as shown in element 220. The pipeline may represent an ordered processing of transaction requests in some implementations. In some embodiments, several or all of the nodes 132 of a DSM collective may share the same transaction pipeline. The transaction pipeline may then receive and parse the encoded transaction, as shown in element 230. If the transaction does not contain any write operations to the logical registry (as indicated by the negative exit from element 240) then the DSM node 132 may process the transaction directly (as indicated in element 250) and reply to the client with a status message and/or any data requested (as shown in element 270).

If however, the transaction does contain write operations, as indicated by the affirmative exit from element 240, then the DSM may modify the logical registry 160. A transaction that includes writes may be referred to herein as a "modifying transaction". Since multiple DSM nodes 132 collectively maintain the registry, the DSM node that received the transaction request may apply the writes by initiating a consensus protocol (e.g., Paxos) among these multiple nodes of the collective, as shown in element 260, before replying to the client with the result, as shown in element 270. The nodes involved in the collective decision as to whether to apply a write may be termed a "jury" herein. Many variations may be possible for executing write operations to the shared logical registry using consensus protocols. In some embodiments, the receiving node may first execute the transaction locally without applying the write operations to the logical registry and then, only after all writes of the transaction are known, apply the changes to the shared registry via a consensus protocol. For example, as the node 132 executes a transaction, the node may create a change request in addition to the normal stack. The change request may include a list of logical registry items read by the transaction execution (i.e., the read-set) and a list of writes to perform (i.e., the write-set). When the node finishes executing the transaction and the write-set is complete, then the modifications in the write-set may be made to the logical registry via a consensus protocol. In some embodiments, the DSM may also confirm that various data items in the read-set have not been modified before committing the changes in the write-set.

In some embodiments, performing the writes via a consensus protocol may include passing the completed change request to a predetermined one of the DSM nodes (which may be termed a "primary" or "primus" node herein), directly or via a queue, for processing. For example, the primus may accept a completed change request and act as the leader in a Paxos protocol to reach consensus on committing the changes to the shared logical registry. In some embodiments, apart from its role in coordinating consensus protocol activities (e.g., in receiving change requests, proposing changes to the jury as described below, and/or communicating jury decisions), the primus may be otherwise similar or identical to other nodes 132 of the DSM. In various embodiments, the primus may be selected from any of the nodes according to any suitable protocol, such as nomination or self-nomination, with or without election. If a primus fails during DSM operation, a new primus may be selected in some embodiments.

Figure 3:
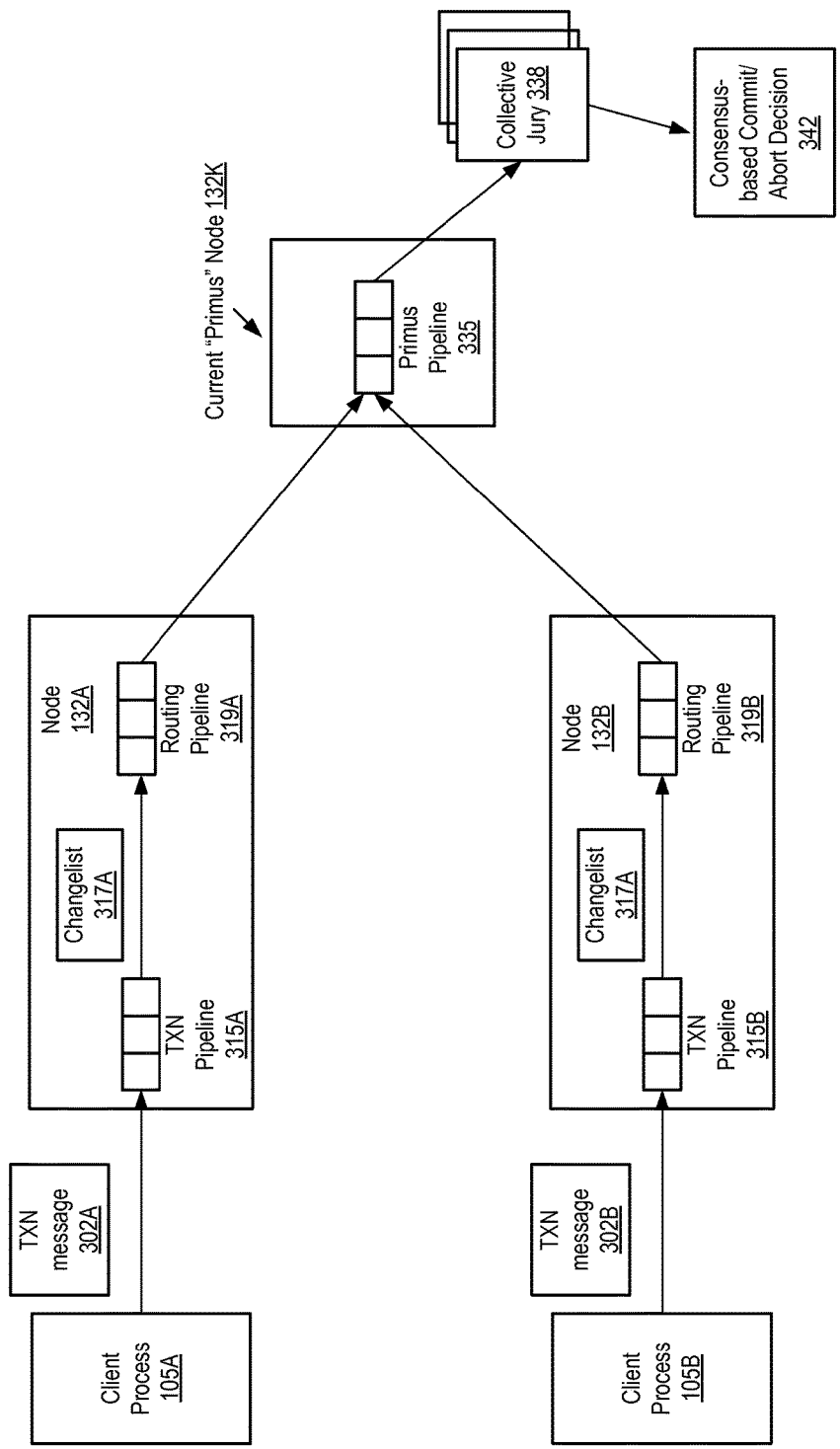
FIG. 3 illustrates example steps taken by the distributed state manager to process modifying (write-containing) transactions, according to at least some embodiments.

FIG. 3 illustrates example steps taken by the DSM to process modifying (write-containing) transactions, according to at least some embodiments. In the illustrated embodiment, client process 105A generates a transaction message 302A for its transaction, which may comprise a list of operations (including at least one write, update, or delete operation) to perform on data in the logical registry 160, and communicates it to a DSM node 132A. The transaction message 302A may be encoded using the client library 115A, and may be transmitted over any appropriate type of network connection. As noted earlier, the transaction may be encoded using a stack-based transaction language in some embodiments. A different client process 105B may encode its own modifying transaction analogously, and transmit it in the form of transaction message 302B to a node 132B of the server cluster 130. In some embodiments, different client processes 105 may submit their transactions to the same node 132; the target node to which a transaction message is sent may be determined using a number of different techniques in different embodiments. In some embodiments, client library component 115 may be responsible for determining which of the server nodes 132 are currently accessible, and selecting from among them using a random-selection policy, a round-robin policy, a least-recently-used policy, or a different selection policy. In other embodiments, the user code of a client process may indicate preferences for selecting server nodes, and the client library may take such preferences into account. As noted earlier, in at least some embodiments the client library component 115 may automatically re-connect to a different DSM node 132 if connectivity to one DSM node is lost.

The DSM node 132 that receives the transaction message 302 may decode the transaction and insert it into a queue maintained for its transaction pipeline 315 (e.g., transaction pipeline 315A for node 132A, or transaction pipeline 315B for node 132B). In some embodiments, if the transaction happened to be read-only, the values of the various registry elements to be read may be obtained from the local copy of the registry, and returned to the client, without any further interactions with the other nodes of the server cluster. Thus, the receiving DSM node 132 may commit read-only transactions independently of other nodes, and may assign a commit timestamp (e.g., the value of the local copy of the registry logical timestamp or DSM time 148) to the transaction. In the illustrated example, however, each transaction comprises at least one write/update/delete operation.

Because the transaction received via message 302A includes a modifying operation, a change list 317A may be constructed and populated for the transaction. For example, node 132A may first construct an empty stack and an empty change list 317A and initiate a transaction processor. The processor may execute the operations of the transaction in sequence, popping each parameter from the stack, reading information from the local copy of the registry, and pushing results back to the stack. During this transaction-processing phase, the node may avoid writing directly to the registry, since the collective must agree upon changes to the registry. Instead, the node may write state changes into the change list 317A that it may submit to the entire collective later. The change list 317A may also include check operations to ensure, for example, that the context of the transaction remains as expected (e.g., to ensure that values of registry elements that are included in a read-set of the transaction have not been changed as a result of other modifying transactions). Similarly, a change list 317B may be constructed for client process 105B's transaction at node 132B.

In different instances, the processing may terminate in different states. For example, the transaction processing may terminate in an error state, indicating that the transaction failed. Alternatively, the transaction processing may terminate in a failed state, indicating that a check failed (e.g., data in the read-set was modified). For modifying transactions, the transaction processing may complete in a pending state, indicating that the operations of the transaction were completed successfully, but the change list is not empty.

If the transaction processing completes in a pending state, then to complete the transaction, the DSM collective must agree to modify the logical registry 160 according to the change list 317 in some embodiments. A given DSM node 132, such as 132A, may attempt to get the DSM collective to agree to commit the changes to the logical registry 160 by initiating a consensus protocol. The node 132 may initiate the consensus protocol by sending the change list 317 to a DSM node in the collective that has been predetermined as the leader. In the illustrated embodiment, a node 132K is designated as the current primary or "primus" node, and the change list 317A may be placed in a routing pipeline 319A for transmission to the primus node 132K. Similarly, change list 317B may be placed in a routing pipeline 319B for transmission to the primus node 132K. The primus node 132K may have its own pipeline 335 in which change lists from various other nodes 132 are enqueued and processed. The primus may then propose the changes in a given change list 317 to other nodes in the collective 130 via a consensus protocol, such as Paxos. In some embodiments, the primus may propose the change to only a subset of the nodes 132 in the collective, which may be referred to herein as the collective jury 338. Once the collective (e.g., either all the nodes 132, or a subset of the nodes that forms the jury) decides on whether to make the change(s) of a change list to the logical registry 160 (e.g., when a consensus-based commit or abort decision 342 is reached), the primus may notify the particular node 132 from which the change list was received of the outcome. In other embodiments, the node 132 that sent the change list 317 may discover the result by reading its updated copy of the registry rather than by receiving an explicit indication from the primus node. The node 132 may then return one or more results of the transaction to the corresponding client process 105, and may indicate the commit time of the transaction (e.g., the DSM time when the transaction's changes were committed to the logical registry). In some embodiments the transaction results may also be encoded using a stack-based language, and decoded by the client library component 115 of the client process. In at least some embodiments, in the event a given transaction does not get committed, the transaction may be retried, either by the receiving node 132 (the node that received the transaction message 302 from the client process 105) or by the client process 105 resubmitting the transaction. Different retry policies may be in effect in different embodiments, governing for example if, when, and by which entities transactions are to be re-attempted.

In some embodiments, a client process 105 may only be permitted to perform certain modifying transactions (e.g., acquiring a lock) if it has been explicitly identified and permitted to do so by the DSM collective. For example, the DSM collective may require that in order to hold a lock, a client process must first identify itself to the DSM collective and/or be allocated a client name from the logical registry. Clients that have been allocated a name may be referred to herein as "named" clients while those that have not may be referred to as "anonymous" clients. In some embodiments, while both named and anonymous clients may read and write entries, only named clients may hold locks. At various times, each lock may be associated with a respective list of named clients currently waiting on that lock. Various possibilities may exist for how a client name may be assigned. For example, in some embodiments, a client process 105 may first choose a client stem as an identifier. When the client process registers for a name with a DSM node 132, the DSM node may construct a client name from the client stem and the DSM time of the node's local registry. The DSM node 132 may then propose the name to the DSM collective in order to enter the name into the logical registry 160.

In several embodiments, the techniques described above for processing read-only and modifying transactions using collective decision making may be employed to implement several features described below, such as various types of asynchronous locking capabilities, transactional watch mechanisms, and versioned read-only caches.

Asynchronous, Idempotent and Queue-Depth-Limited Locking

Figure 4:
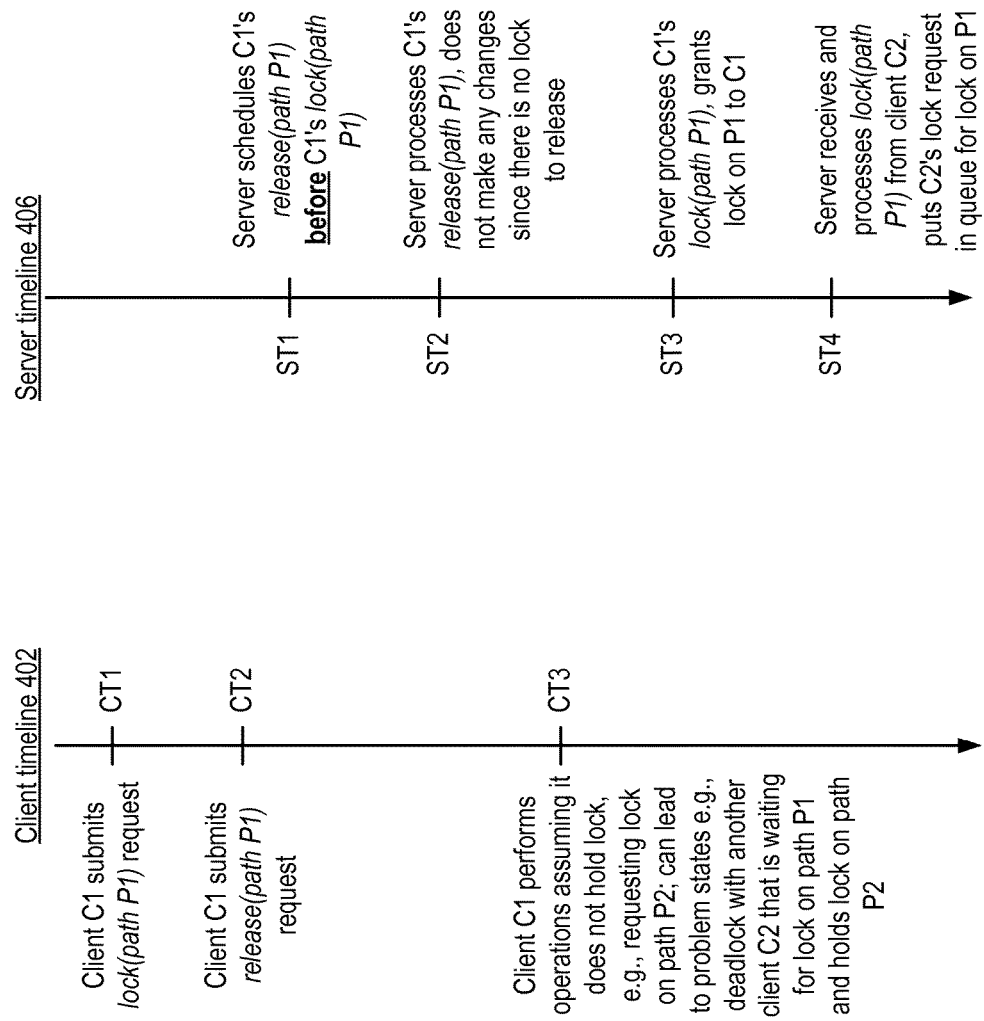
FIG. 4 illustrates an example of a sequence of client and server operations that includes a lock cancellation request being processed out of order, according to at least some embodiments.

As described above, processing of modifying client requests (such as acquiring or releasing of locks) may involve various queueing steps, pipelines, and network messages at different nodes of the DSM. At least in some cases, requests transmitted from a given client process 105 may not be processed in the order expected by the client, which may potentially lead to some problems. FIG. 4 illustrates an example of a sequence of client and server operations that includes a lock cancellation request being processed out of order, according to at least some embodiments. In FIG. 4, the sequencing of client-side operations is shown along client timeline 402, and the sequencing of DSM server node operations is shown along server timeline 406. (The client and server timelines shown are intended to represent relative clock times.)

At client time CT1, a particular client (e.g., a client process) C1 submits a lock request for path P1 of the logical registry 160. Later, at client time CT2, the client C1 decides it does not need the lock, and submits a release request for the lock, indicating that C1's lock request should be removed from a lock queue for P1 (or that if the lock for P1 was already granted to C1, the lock should be released). In the illustrated example, at server time ST1, server node 132 happens to schedule the processing of the release request before the processing of the lock request. (This may occur due to any of a number of reasons in a distributed system, e.g., due to longer network delays encountered by the lock request, the release request may have been received earlier than the lock request.) Since C1 neither holds a lock on P1, nor is C1 queued for a lock on P1, the server may simply ignore the release request (or return a success indicator to the client C1 for the release request), e.g., at time ST2. The client C1 may, e.g., at time CT3, perform operations assuming that it does not hold the lock on path P. For example, the client C1 could submit another request to lock a different path P2, which may be held by a different client C2. Thus, at server time ST3, client C1's lock request for P2 may be placed in a queue of waiters for P2. Meanwhile, some time after the release request was processed, the server may process the lock request, and grant the lock on path P1 to client C1. At this stage, C1 is waiting for a lock held by C2, and is holding a lock on P1. If, at server time ST4, a request to lock P1 is received from C2, the server may place C2's lock request in a queue for P1. Thus, C1 and C2 may both be waiting for each other to release a respective lock—i.e., a deadlock may have arisen.

One approach to avoiding the type of problem illustrated in FIG. 4 may be to for client processes to ensure that they do not issue lock release requests until their lock requests are either (a) placed in a queue for the lock or (b) granted. Accordingly, the DSM may support one or more queue-for-lock (QFL) APIs in some embodiments, so that client processes may be notified when their lock requests are queued, and can therefore be assured that any release or cancel request after such a notification would be processed correctly (i.e., either the server would remove the lock request from the queue, or free the lock if it had already been granted). In at least some embodiments, the DSM may implement queue-for-lock using a two-stage asynchronous notification process—a first notification to the client when its lock request is queued, and a second notification when the lock is granted.

In at least one embodiment, in response to a QFL request specifying a target registry element to be locked, the submitter of a QFL request may be provided a reference to a first asynchronous computation (e.g., using a programming construct implementing functionality similar to that provided by the Java™ language "Future" interface ("java.lang.concurrent.Future")), where the first asynchronous computation comprises an insertion of a lock request on behalf of the submitter into a queue of waiters for a lock on the target element. The first asynchronous computation may be referred to as "Future1" herein for implementations using the Future interface or its logical equivalent. The QFL submitter process may then proceed to other computations, as desired, until it wishes to determine the result of the first asynchronous computation (i.e., to determine whether the lock request got queued on its behalf). The decision as to whether to queue the submitter's lock request may be made by the server nodes 132 of the DSM in some embodiments, e.g., using a consensus protocol as described earlier. The QFL submitter client process 105 may submit a blocking request for a result of the first asynchronous computation, e.g., using the equivalent of a blocking "Future1.get( )" method. In response to the blocking request for the result, the DSM may provide a notification to the client process after the lock request has been successfully queued on behalf of the client process (thus indicating to the client process that a cancellation request, if desired, may be safely submitted). When the asynchronous computation associated with a Future construct completes, the Future is termed to have become "redeemable", and the get( )method on the Future returns successfully (i.e., a client thread that issued the get( ), waiting for a result, is unblocked). Similarly, the phrase "the DSM makes the Future F redeemable" may be used herein to indicate that the DSM completes the asynchronous operation associated with F, so that if and when the client issues F.get( ), the get( ) call returns (e.g., either an object of a specified type may be returned from the get( ), or a void).

The first notification provided by the DSM in turn may comprise a reference to a second asynchronous computation (e.g., a second Future, Future2) in some embodiments, where the second asynchronous computation comprises an acquisition of the lock on the target element by the client process. The client process may then proceed to other activities, and submit a second blocking request (e.g., Future2.get( )) when it wishes to obtain the result of the second asynchronous computation. If the second asynchronous operation succeeds (e.g., Future2.get( ) returns successfully or Future2 becomes redeemable, as a result of a DSM decision that may also rely on a consensus protocol), this indicates that the client process now owns the desired lock. One example implementation using two Futures for a single QFL request may be represented by the following pseudocode.

Figure 5:
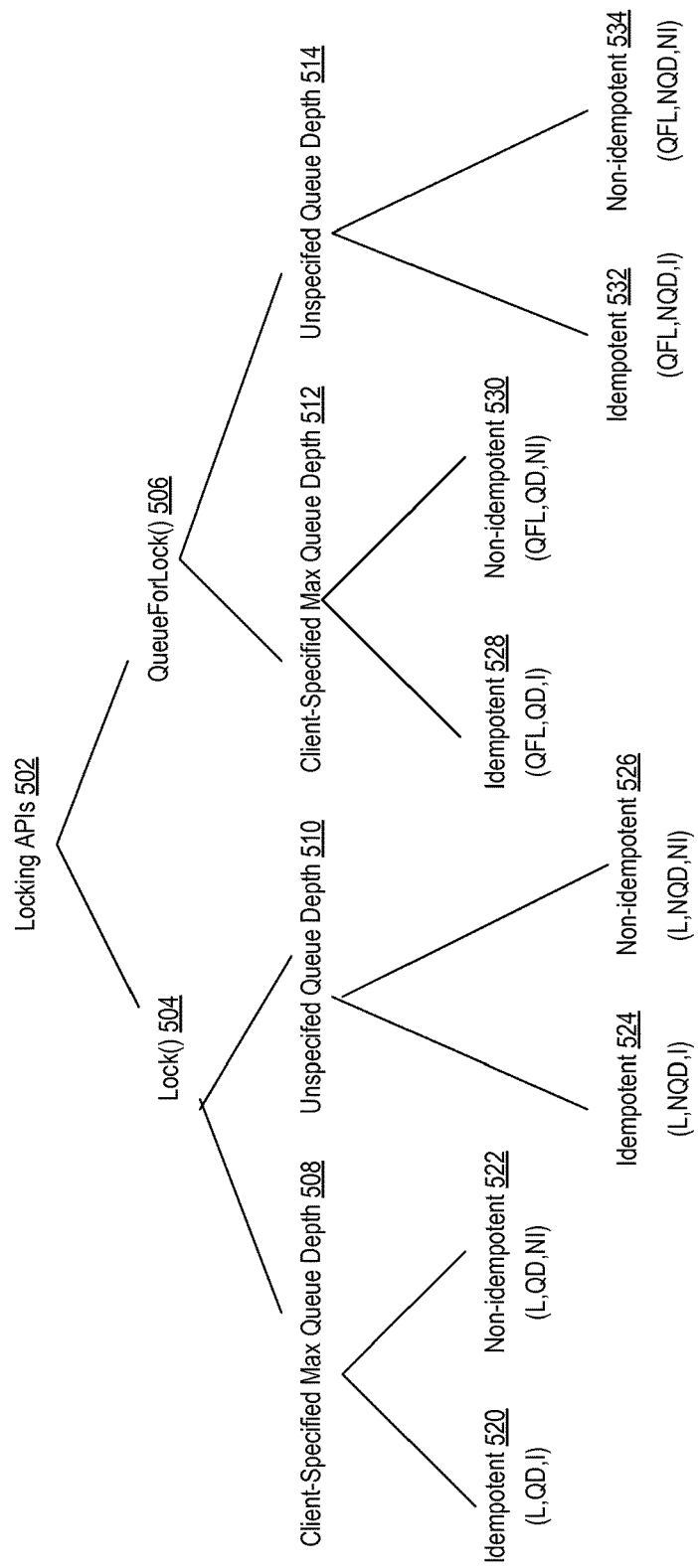
FIG. 5 illustrates a set of locking related APIs, including several queue-for-lock APIs, that may be implemented by a distributed state manager, according to at least some embodiments.

1. // client process submits QFL request for "targetElement" of registry
2. Future<Future<Lock>>future1=queueForLock(targetElement);
3. // client process can do other work until it wants to know result of future1
4. [other work . . . ]
5. // client process blocks for result of future1, waiting for future1 to become redeemable
6. Future<Lock>future2=future1.get( );
7. // once future1.get( ) returns, this means the lock request is in the queue;
8. // lock release/cancellation can be done safely
9. // client process can do other work until it wants to know if it got the lock
10. [other work . . . ]
11. // client process blocks for result of future2
12. Lock lock=future2.get( );
13. // once future2.get( ) returns, the client has the lock FIG. 5 illustrates a set of locking related APIs, including several QFL APIs, that may be implemented by a DSM, according to at least some embodiments. As shown, the locking APIs may be distinguished from each other along three dimensions: (a) whether they include two-step asynchronous notifications to the client, including a notification when the client's request is queued, and a second notification when the lock is granted, or whether a notification is only provided when the lock is granted (b) whether a maximum queue depth is specified for the lock and (c) whether the request is idempotent or not. The first dimension (referred to as (a) above) will be referred to herein using the notations QFL (for the two-step asynchronous notification) versus L (for the one-step asynchronous notification. The second dimension will be referred to using the notation QD (for the cases where a maximum queue depth is specified) versus NQD (for the cases where no maximum queue depth is specified), and the third dimension will be refereed to herein using the notation I (for idempotent) versus NI (for non-idempotent). Further details for each of the eight types of APIs implemented for the possible combinations of these three characteristics (QFL,NQD,NI), (QFL,NQD,I), (QFL,QD,NI), (QFL,QD,I), (L,NQD,NI), (L,NQD,I), (L,QD,NI), and (L,QD,I), are provided below. In some embodiments, the idempotency and maximum-queue depth characteristics of a given lock request may be specified using parameters of the API call—e.g., a queueForLock(path P, Boolean idempotent, int maxQueueDepth) API may be used for the various QFL cases. In other embodiments, instead of using parameters, different APIs may be implemented—e.g., queueForLock( ) versus queueForLockIdempotent( ), for example. It is noted that in some embodiments, only a subset of these combinations may be implemented. It is further noted that although, in the subsequent description, the functionality for these various APIs is described in the context of using "Future" constructs or their equivalents for representing asynchronous computations, other techniques may be used for asynchronous computations and notifications in at least some embodiments. In some implementations, a request for a lock (either a queue-for-lock request or a lock request) may specify simply a registry path that is to be locked, without specifying any particular registry element or element type. In other implementations, the locking APIs may allow the client to indicate a specific element (e.g., a session or a data entry) or element type, having the specified registry path, to be locked.

Figure 6:
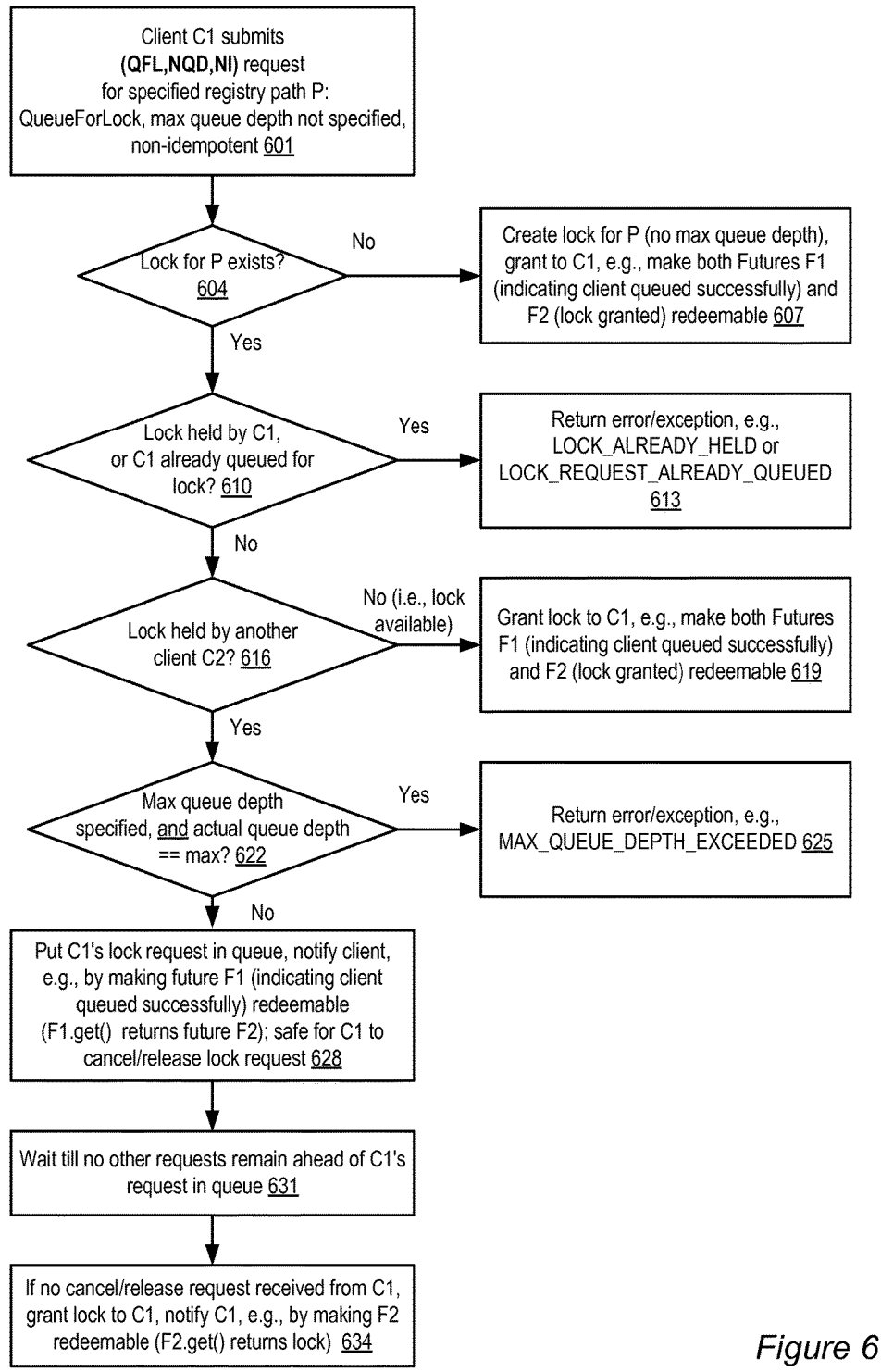
FIG. 6 is a flow diagram illustrating aspects of the functionality of a distributed state manager configured to implement a non-idempotent queue-for-lock API that does not specify a maximum lock queue depth, according to at least some embodiments.

FIG. 6 is a flow diagram illustrating aspects of the functionality of a DSM configured to implement a non-idempotent queue-for-lock API that does not specify a maximum lock queue depth (i.e., the (QFL, NQD, NI) API), according to at least some embodiments. As shown in element 601, a client C1 (e.g., client process 105) may submit a (QFL,NQD,NI) request specifying a registry element with path P to be locked. The request may be submitted using a client library component 115. The DSM (e.g., some combination of one or more server nodes 132) may take one or more actions depending on such factors as whether a lock already exists, and if so, whether the lock is available or not.

If a lock for the specified path P does not exist (as determined in element 604), the DSM may create a lock for that path, and grant the lock to the requesting client C1 (element 607). No indication of a maximum supported lock queue depth may be stored for the newly-created lock in the depicted embodiment (since a maximum queue depth was not specified in the request). In implementations where a Future mechanism or its logical equivalent is being used, the DSM may make two futures redeemable—i.e., a get( ) operation on the first future F1 (intended to notify the client when its request was successfully queued, if queueing were needed) may succeed, returning the second Future F2, and a get( ) on the second Future may also succeed, indicating to the client that the lock has been acquired. It is noted that the F1 future is made redeemable even though a client lock request does not have to be queued in element 607; thus, in this scenario, making F1 redeemable may be indicative of the DSM checking whether queueing is required, and determining that queueing is not required, rather than F1 being indicative of a request actually being queued.

If a lock for P1 does exist, and the requesting client either (a) already holds the lock or (b) is already enqueued for the lock (i.e., another request on behalf of C1 has already been placed in a queue of waiters for the lock), as determined in element 610 of FIG. 6, the DSM may in some embodiments return an error indication such as an exception to the client C1 (element 613). In some implementations, an error or exception code or message provided to the client may indicate the reason for the failure of the QFL request—e.g., a meaningful error message "LOCK_ALREADY_HELD" or "LOCK_REQUEST_ALREADY_QUEUED" may be provided. (It is noted that, as discussed below, if an idempotent version of QFL were submitted by the client, such an error indication may not be provided, and the DSM may simply ignore the duplicate request.)

If the lock exists, and C1 is neither already queued nor a holder of the lock, the DSM may determine whether the lock is currently held by another client C2 (element 616). If the lock is available (i.e., no other client holds it), C1 may be granted the lock (element 619). As in the operations illustrated in element 607, in implementations where Futures or Future-equivalent constructs are used, both futures may be made redeemable.

If the lock exists, and is currently held by another client C2, in the illustrated embodiment, the DSM may determine whether a maximum queue depth was specified for the lock when it was created. If such a maximum queue depth was specified, and the current queue depth equals the maximum (as determined in element 622), the DSM may reject C1's QFL request and provide an error indication (element 625). In some implementations a meaningful error message (e.g., "MAXIMUM_LOCK_QUEUE_DEPTH_EXCEEDED") may be provided.

If either (a) no maximum queue depth was specified or (b) a maximum queue depth was specified and the current queue depth is less than the maximum (as also determined in element 622), the DSM may place C1's lock request in the queue of waiting lock requests for P (element 628), and notify C1 that the request has been queued. In implementations employing Futures or their logical equivalent, the first Future F1 may be made redeemable—i.e., if the client C1 issues a F1.get( ) call, the second future F2 may be returned. The fact that F1 is redeemable may indicate to the client that it is now safe to submit a lock cancel/release request, should such a request be needed. After C1's request has been placed in the lock queue, the DSM may wait until there are no other requests ahead of C1's request, and the lock is released by the then-current owner (element 631). When the lock becomes available, (and assuming that no cancellation request was received in the interim), the DSM may grant the lock to C1 (element 634). In some implementations, the Future F2 may become redeemable at this point, and the requested lock may be returned in response to F2.get( ). It is noted that, as with other modifying operations handled by the DSM, at least a portion of the computation and/or a subset of the decisions involved in responding to the QFL request may be performed collectively by a plurality of the nodes 132 in some embodiments, e.g. using a consensus protocol. Thus, at least in some implementations, the QFL request may represent a modifying transaction that may be handled using the kinds of approaches illustrated in FIGS. 2 and 3, and the decisions as to whether to place a lock request in a wait queue on behalf of the client, or as to whether to grant the lock to the client, may be made using the consensus-based protocol.

Figure 7:
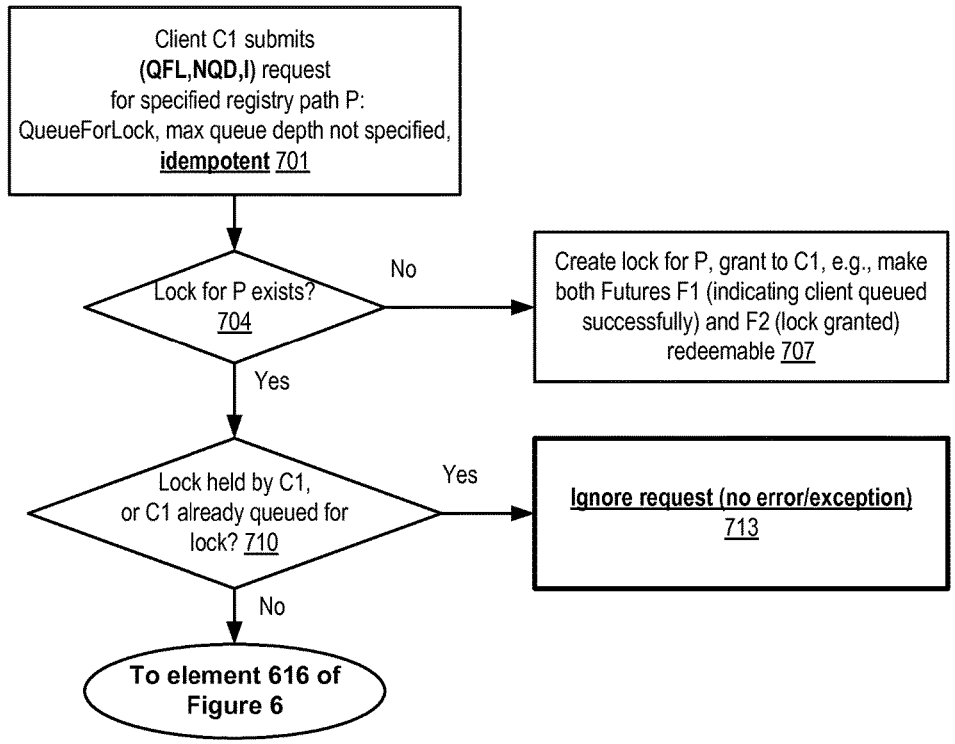
FIG. 7 is a flow diagram illustrating aspects of the functionality of a distributed state manager configured to implement an idempotent queue-for-lock API that does not specify a maximum lock queue depth, according to at least some embodiments.
Figure 8:
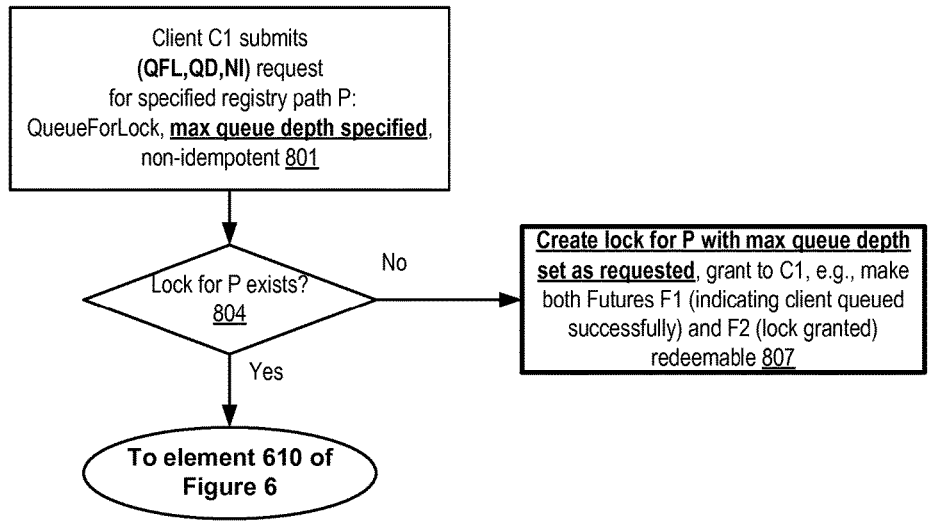
FIG. 8 is a flow diagram illustrating aspects of the functionality of a distributed state manager configured to implement a non-idempotent queue-for-lock API that specifies a maximum lock queue depth, according to at least some embodiments.
Figure 9:
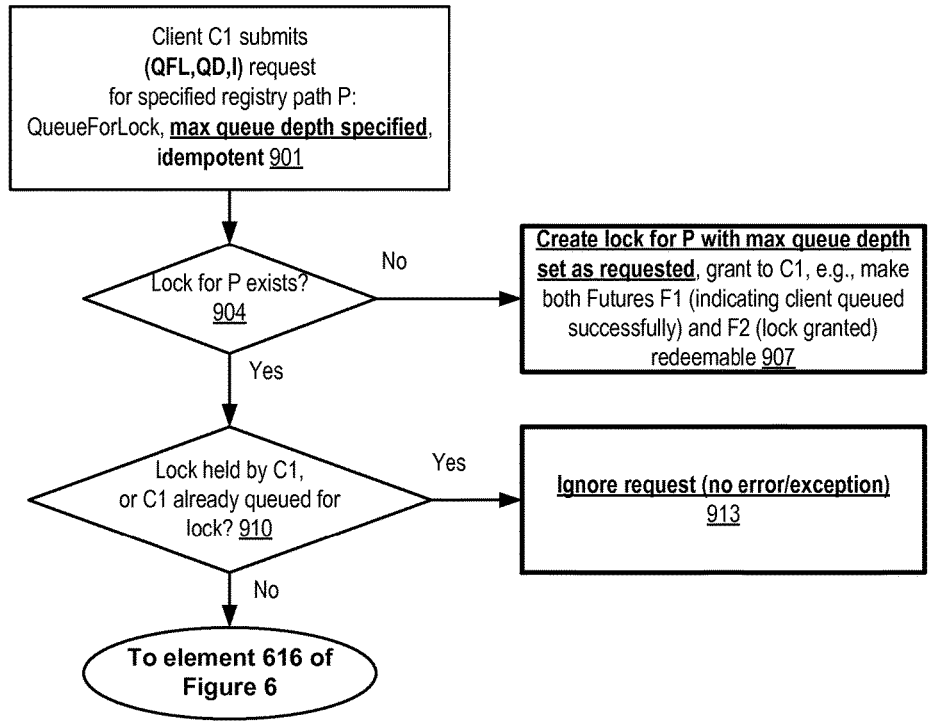
FIG. 9 is a flow diagram illustrating aspects of the functionality of a distributed state manager configured to implement an idempotent queue-for-lock API that specifies a maximum lock queue depth, according to at least some embodiments.

FIGS. 7, 8 and 9 illustrate functionality related to three other QFL APIs that may be implemented by the DSM in some embodiments. FIG. 7 is a flow diagram illustrating aspects of the functionality of a distributed state manager configured to implement an idempotent queue-for-lock API that does not specify a maximum lock queue depth (i.e., the (QFL, NQD, I) API), according to at least some embodiments. In the illustrated embodiment, the main difference between the operations performed for the (QFL, NQD, I) API and those illustrated in FIG. 6 for the (QFL, NQD, NI) API are shown in element 713. That is, in the (QFL, NQD, I) scenario, when and if the DSM determines that a lock for the specified registry path P does exist, and that the requesting client C1 either already holds the lock or is already waiting for the lock to be granted (i.e., a lock request is in a waiter's queue for the lock on P), instead of indicating an error or throwing an exception, the DSM may simply ignore the (QFL,NQD,I) request. Other than the operations illustrated in element 713 of FIG. 7 (which differ from those illustrated in element 613 of FIG. 6), the operations performed as a result of a (QFL,NQD,I) request may be similar to those illustrated in FIG. 6 in the illustrated embodiment. That is, the same kind of two-stage asynchronous notifications may be provided as shown in FIG. 6.

FIG. 8 is a flow diagram illustrating aspects of the functionality of a distributed state manager configured to implement a non-idempotent queue-for-lock API that specifies a maximum lock queue depth (i.e., the (QFL, QD, NI) API), according to at least some embodiments. In the illustrated embodiment, the operations performed as a result of a (QFL, QD, NI) request differ from those illustrated in FIG. 6 for the (QFL, NQD, NI) only when there is no lock existing for path P when the DSM processes the request. As shown in element 807 of FIG. 8, if no lock exists for the path P, the DSM may create a new lock with a maximum queue depth associated with it. The maximum queue depth may, for example, be included in metadata maintained for the lock associated with path P, and stored in the registry 160. The newly created lock may be granted to the requester C1, and the two futures may be made redeemable, as in element 607 of FIG. 6, in some implementations. Thus, the specification of the maximum queue depth in the (QFL, QD, NI) scenario may impact subsequent QFL or lock requests; the current request may not directly be affected, since there is no queueing required. In the embodiment depicted in FIG. 8, if a lock already exists for the path P when the (QFL, QD, NI) request is received, the specified maximum queue depth may simply be ignored, regardless of whether the existing lock has a maximum queue depth specified or not. Thus, if the lock exists, as determined in element 804, the remainder of the operations performed for a (QFL, QD, NI) request may be very similar to those performed for a (QFL, NQD, NI) request, shown in FIG. 6. In other embodiments, the maximum queue depth indicated in the (QFL, QD, NI) request may be taken into consideration when deciding whether to place the client's lock request in the lock queue—e.g., if the lock is currently held by a different client C2 and the size of the lock queue is equal to or greater than the specified maximum queue depth, the DSM may reject the (QFL, QD, NI) request in some embodiments.

FIG. 9 is a flow diagram illustrating aspects of the functionality of a distributed state manager configured to implement an idempotent queue-for-lock API that specifies a maximum lock queue depth (i.e., the (QFL, QD, I) API), according to at least some embodiments. In the depicted embodiment, the operations performed by the DSM may be similar to those shown in FIG. 8 if the lock does not currently exist (i.e., a new lock with the specified maximum lock queue depth may be established in the registry), and similar to those shown in FIG. 7 for the case where the lock exists and is already either held or being waited for by client C1 (i.e., no error or exception may be indicated in such cases). Other operations performed in response to a (QFL, QD, I) request may be similar to those performed for a (QFL, NQD, NI) request shown in FIG. 6, as indicated by the element notated "To element 616 of FIG. 6" in FIG. 9.

As described above, implementing each of the QFL APIs may involve providing two asynchronous notifications to the requesting client in some embodiments. In some environments, some users of the DSM may not be concerned about the potential problems associated with out-of-order lock cancellations that are made easier to avoid by using QFL APIs, but may still be interested in the types of idempotency and maximum-queue-depth features described above.

Accordingly, the DSM may support idempotency and/or maximum lock queue depths for non-QFL lock requests in some embodiments, in addition to or instead of the similar QFL features. In at least some implementations, a single-step asynchronous notification process may be used for non-QFL requests, in which for example the client is notified when the lock is granted (not when the lock request is queued, as in the QFL cases). A single Future construct may be used in some implementations, instead of the two Futures F1 and F2 discussed with respect to FIG. 6. FIGS. 10-13 illustrate functionality of the DSM to support four types of (non-QFL) asynchronous lock APIs.

Figure 10:
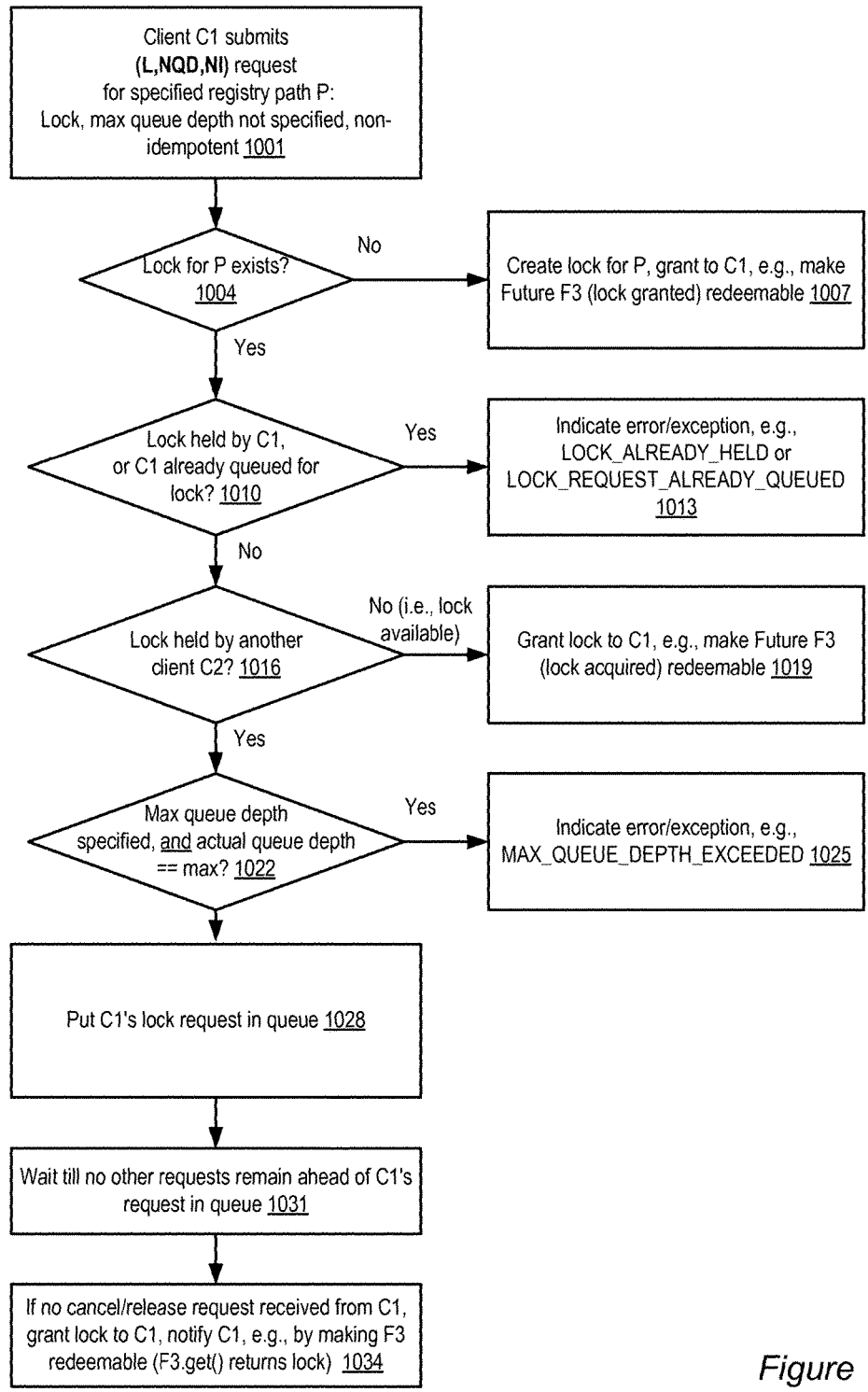
FIG. 10 is a flow diagram illustrating aspects of the functionality of a distributed state manager configured to implement a non-idempotent lock API that does not specify a maximum lock queue depth, according to at least some embodiments.

FIG. 10 is a flow diagram illustrating aspects of the functionality of a distributed state manager configured to implement a non-idempotent lock API that does not specify a maximum lock queue depth (i.e., the (L, NQD, NI) shown in FIG. 5), according to at least some embodiments. As shown in element 1001, a client C1 (e.g., client process 105) may submit a (L, NQD, NI) request specifying a registry element with path P to be locked. The request may be submitted using a client library component 115. The DSM (e.g., some combination of one or more server nodes 132) may take one or more actions depending on such factors as whether a lock already exists, and if so, whether the lock is available or not.

If a lock for the specified path P does not exist (as determined in element 1004), the DSM may create a lock for that path, and grant the lock to the requesting client C1 (element 1007). No indication of a maximum supported lock queue depth may be stored for the newly-created lock in the depicted embodiment (since a maximum queue depth was not specified in the request). In implementations where a Future mechanism or its logical equivalent is being used, the DSM may make one future F3 redeemable—i.e., a get( ) operation on the future F3 may succeed, indicating to the client that the lock has been acquired.

If a lock for P1 does exist, and the requesting client either (a) already holds the lock or (b) is already enqueued for the lock (i.e., another request on behalf of C1 has already been placed in a queue of waiters for the lock), as determined in element 1010 of FIG. 10, the DSM may in some embodiments return an error indication such as an exception to the client C1 (element 1013). In some implementations, an error or exception code or message provided to the client may indicate the reason for the failure of the lock request—e.g., a meaningful error message "LOCK_ALREADY_HELD" or "LOCK_REQUEST_ALREADY_QUEUED" may be provided. (It is noted that, as discussed below, if an idempotent version of the lock request were submitted by the client, such an error indication may not be provided, and the DSM may simply ignore the duplicate request.)

If the lock exists, and C1 is neither already queued nor a holder of the lock, the DSM may determine whether the lock is currently held by another client C2 (element 1016). If the lock is available (i.e., no other client holds it), C1 may be granted the lock (element 1019). As in the operations illustrated in element 1007, in implementations where Futures or Future-equivalent constructs are used, the future F3 may be made redeemable.

If the lock exists, and is currently held by another client C2, in the illustrated embodiment, the DSM may determine whether a maximum queue depth was specified for the lock when it was created. If such a maximum queue depth was specified, and the current queue depth equals the maximum (as determined in element 1022), the DSM may reject C1's QFL request and provide an error indication (element 1025). In some implementations a meaningful error message (e.g., "MAXIMUM_LOCK_QUEUE_DEPTH_EXCEEDED") may be provided.

If either (a) no maximum queue depth was specified or (b) a maximum queue depth was specified and the current queue depth is less than the maximum (as also determined in element 1022), the DSM may place C1's lock request in the queue of waiting lock requests for P (element 1028). In contrast to the corresponding QFL case, no explicit notification may be provided at this stage in the depicted embodiment. After C1's request has been placed in the lock queue, the DSM may wait until there are no other requests ahead of C1's request, and the lock is released by the then-current owner (element 1031). When the lock becomes available, (and assuming that no cancellation request was received in the interim), the DSM may grant the lock to C1 (element 1034). In some implementations, the Future F3 may become redeemable at this point, and the requested lock may be returned in response to F3.get( ). It is noted that, as with other modifying operations handled by the DSM, at least a portion of the computation and/or decisions involved in responding to the L request may be performed collectively by a plurality of the nodes 132 in some embodiments, e.g. using a consensus protocol. Thus, at least in some implementations, the L request may represent a modifying transaction that may be handled using the kinds of approaches illustrated in FIGS. 2 and 3.

Figure 11:
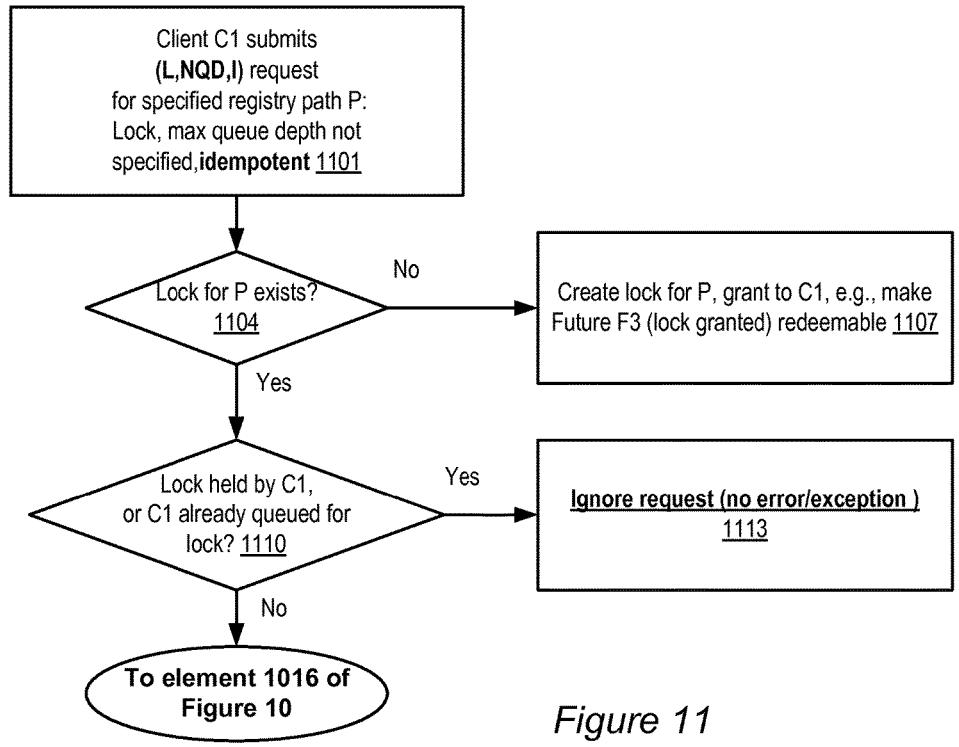
FIG. 11 is a flow diagram illustrating aspects of the functionality of a distributed state manager configured to implement an idempotent lock API that does not specify a maximum lock queue depth, according to at least some embodiments.

FIG. 11 is a flow diagram illustrating aspects of the functionality of a distributed state manager configured to implement an idempotent lock API that does not specify a maximum lock queue depth (i.e., the (L, NQD, I) API), according to at least some embodiments. In the illustrated embodiment, the main difference between the operations performed for the (L, NQD, I) API and those illustrated in FIG. 10 for the (L, NQD, NI) API are shown in element 1113. That is, in the (L, NQD, I) scenario, when and if the DSM determines that a lock for the specified registry path P does exist, and that the requesting client C1 either already holds the lock or is already waiting for the lock to be granted (i.e., a lock request is in a waiter's queue for the lock on P), instead of indicating an error or throwing an exception, the DSM may simply ignore the (L,NQD,I) request. Other than the operations illustrated in element 1113 of FIG. 11 (which differ from those illustrated in element 1013 of FIG. 10), the operations performed as a result of a (L,NQD,I) request may be similar to those illustrated in FIG. 10 in the illustrated embodiment, as indicated by the element labeled "To element 1016 of FIG. 10" in FIG. 11.

Figure 12:
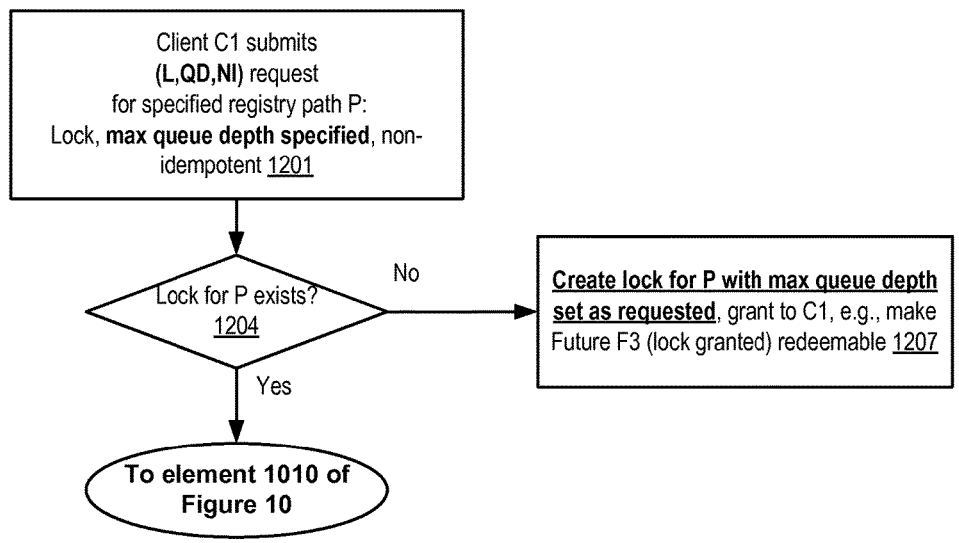
FIG. 12 is a flow diagram illustrating aspects of the functionality of a distributed state manager configured to implement a non-idempotent lock API that specifies a maximum lock queue depth, according to at least some embodiments.

FIG. 12 is a flow diagram illustrating aspects of the functionality of a distributed state manager configured to implement a non-idempotent lock API that specifies a maximum lock queue depth (i.e., the (L, QD, NI) API), according to at least some embodiments. In the illustrated embodiment, the operations performed as a result of a (L, QD, NI) request differ from those illustrated in FIG. 10 for the (L, NQD, NI) only when there is no lock existing for path P when the DSM processes the request. As shown in element 1207 of FIG. 12, if no lock exists for the path P, the DSM may create a new lock with a maximum queue depth associated with it. The maximum queue depth may, for example, be included in metadata maintained for the lock associated with path P, and stored in the registry 160. The newly created lock may be granted to the requester C1, and the Future F3 may be made redeemable, as in element 1007 of FIG. 10, in some implementations. Thus, the specification of the maximum queue depth in the (L, QD, NI) scenario may impact subsequent QFL or lock requests; the current request may not directly be affected, since there is no queueing required. In the embodiment depicted in FIG. 12, if a lock already exists for the path P when the (L, QD, NI) request is received, the specified maximum queue depth may simply be ignored, regardless of whether the existing lock has a maximum queue depth specified or not. Thus, if the lock exists, as determined in element 1204, the remainder of the operations performed for a (L, QD, NI) request may be very similar to those performed for a (L, NQD, NI) request, shown in FIG. 10. In other embodiments, the maximum queue depth indicated in the (L, QD, NI) request may be taken into consideration when deciding whether to place the client's lock request in the lock queue—e.g., if the lock is currently held by a different client C2 and the size of the lock queue is equal to or greater than the specified maximum queue depth, the DSM may reject the (L, QD, NI) request in some embodiments.

Figure 13:
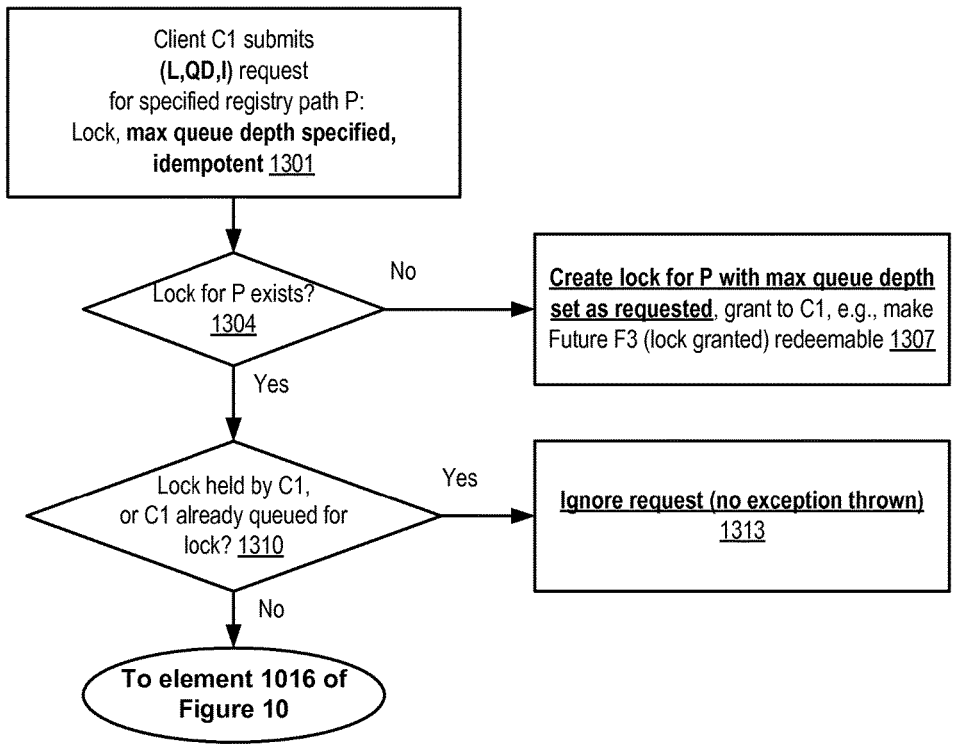
FIG. 13 is a flow diagram illustrating aspects of the functionality of a distributed state manager configured to implement an idempotent lock API that specifies a maximum lock queue depth, according to at least some embodiments.

FIG. 13 is a flow diagram illustrating aspects of the functionality of a distributed state manager configured to implement an idempotent lock API that specifies a maximum lock queue depth (i.e., the (L, QD, I) API), according to at least some embodiments. In the depicted embodiment, the operations performed by the DSM may be similar to those shown in FIG. 12 if the lock does not currently exist (i.e., a new lock with the specified maximum lock queue depth may be established in the registry), and similar to those shown in FIG. 11 for the case where the lock exists and is already either held or being waited for by client C1 (i.e., no error or exception may be indicated in such cases). Other operations performed in response to a (L, QD, I) request may be similar to those performed for a (L, NQD, NI) request shown in FIG. 10, as indicated by the element notated "To element 1016 of FIG. 10" in FIG. 13.

Transactional Watch Mechanism

Some distributed applications 102 may use the DSM for managing metadata that is read fairly frequently and is updated less frequently. For example, a DSM may be used to manage group membership (e.g., the number of application instances that are currently active), or dynamic configuration information (e.g., platform configurations for a quality assurance (QA) or performance test organization). In the dynamic configuration management use case for a QA or test organization, for example, if a platform configuration is changed, or if a new test scenario is identified, and corresponding updates are stored in the registry, some new tests may need to be added to the test suite. In the group membership use case, one or more client processes may attempt to monitor all active DSM sessions (which may indicate the state of application instances) or locks to keep track of the membership changes or member state changes. Another traditional approach may involve polling the DSM at some intervals, and assuming that the registry does not change significantly between successive polling operations. However, such polling and monitoring approaches may have several drawbacks. First, there may be a delay between when the registry gets updated and when the client process learns about the change, which may affect the correctness or accuracy of the decisions made by the client. Second, depending on the number of registry elements of interest, polling or monitoring the entire set of elements may be slow. Thirdly, substantial overhead may be incurred, at the server nodes, along network paths between the clients and the servers, and at the client processes themselves.

Accordingly, in some embodiments, the DSM may provide support for efficient transactional watch mechanisms that may alleviate the need for expensive polling operations. Clients may establish watches by specifying a set of registry elements of interest (e.g., as one or more exact paths or parent paths whose descendant elements are to be watched), and a notification destination, such as a watch or a queue. Once a watch is established, the DSM may ensure that notifications for all subsequent updates are provided to the client that requested the watch, until the client decides to stop or terminate the watch. The watch mechanism may provide at least four invariants in some embodiments: (a) validity (b) monotonicity (c) uniqueness and (d) selectivity. The validity invariant may imply that no updates are lost, even if a given DSM node 132 crashes or connectivity to a given node 132 is lost from the client, as long as the client can connect to at least one DSM server successfully. The monotonicity invariant may indicate that notifications for all updates are provided to the client in the order in which the updates occurred (e.g., in the order of the DSM logical timestamp associated with the updates). The uniqueness invariant may imply no duplicate update notifications; i.e., that one and only one update is sent to the client for each update. The selectivity invariant may imply that updates for only those registry paths specified by the client are provided.

Clients (e.g., client processes 105) may specify the set of registry elements of interest using filter constructs in some embodiments, where a given filter may specify one or more registry paths, and one or more filters may be applied to a given watch. Clients may specify any of several types of supported notification destinations for the watch updates in different embodiments, e.g., as executable handler threads to which notifications are passed, or as queues into which notification objects are placed. In at least some embodiments, a client may be able to choose whether to (a) include a watch establishment request (WER) in a transaction submitted to the DSM, where the transaction includes one or more read or write operations other than the WER itself or (b) submit the watch establishment request independently of any other reads/writes. In the case where the WER is submitted as part of a transaction, the DSM may use the transaction processing techniques described earlier (e.g., including the use of a consensus-based protocol) to determine a commit timestamp of the transaction (the DSM time at which the transaction is committed), and set the watch establishment time to the commit time of the transaction. In the case where a WER is submitted separately from any other read/write operation, the DSM may in some implementations generate a transaction comprising one or more operations involved in establishment of the watch (such as an instantiation of an executable thread or threads responsible for transmitting updates to the client), and set the watch establishment time to the commit time of the internally-generated transaction. In other implementations, the establishment time of the watch may be determined by the DSM based on other factors.

Once a watch establishment time (WET) has been determined for the watch requested, the DSM may ensure that notifications for any registry updates with commit times at or after the WET are transmitted to the client in accordance with the invariants discussed above, until the client explicitly removes the watch, or the client exits. A number of APIs associated with setting up and using the watch mechanism may be implemented in various embodiments, and exposed to the clients via the client library components of the DSM, as described below in further detail. For example, in one implementation, operations corresponding to the following pseudocode may be performed to set up a watch independently of a transaction.

1. // client sets up a queue to be used as a notification destination

2.  BlockingQueue<List<DSMUpdate>>queue=new BlockingQueue<List<DSMUpdate>>;
3.  // client sets up a filter object indicating registry elements of interest
4.  DSMUpdateFilter filter=DSMUpdateFilter(path P);
5.  // client requests watch setup with specified filter and destination queue, on a particular logical connection established with the DSM
6.  DSMWatch watch=DSMconnection.installWatch(filter, queue).get( );

It is noted that in line 6 of the above example pseudocode, the installWatch( ) method returns a reference to an asynchronous operation (similar in concept to a Future). The get( ) method invoked on the installWatch( ) may represent a blocking operation, i.e., the client submitting the watch request may have to block until the DSM sets up the watch and allows the get( ) to return.

The following pseudocode may represent a watch established as part of a transaction that includes a read operation, according to some embodiments.
1.  // client creates a client-side watch operation object associated with a queue and a filter
2.  DSMOperation<DSMWatch>watch= DSMconnection.createWatchOperation(queue, Filter);
3.  // client generates a read request
4.  DSMOperation<DSMRegistryElement>read= DSMOperations.readElement(path);
5.  // client submits a transaction request that combines the read and the watch establishment
6.  DSMconnection.submit(read, watch).get( );

In the above example, the DSMconnection.submit( ) call implicitly submits a transaction request to the DSM (including the read and the watch establishment request), even though no specific startTransaction API is provided. The DSMconnection.submit( ).get( ) call may also represent a blocking call, i.e., the client process may have to wait until the DSM commits or aborts the transaction, before the client can proceed to other activities.

Once the watch is established, either as part of a transaction or independently, the destination specified by the client process (e.g., a queue in the above pseudocode) may start receiving update notifications from the DSM. In at least some embodiments, for each registry element updated, the DSM may provide any combination of several values: e.g., the new value of the element, the old value of the element, the DSM timestamp indicating the commit time of the update, and/or the DSM timestamp of the DSM node 132 (i.e., the value of the local registry logical timestamp 148 at the node that is providing the update). In some implementations one or more of these values (e.g., the old value of the element, or the DSM timestamp of the DSM node) may not be included in an update notification.

Figure 14:
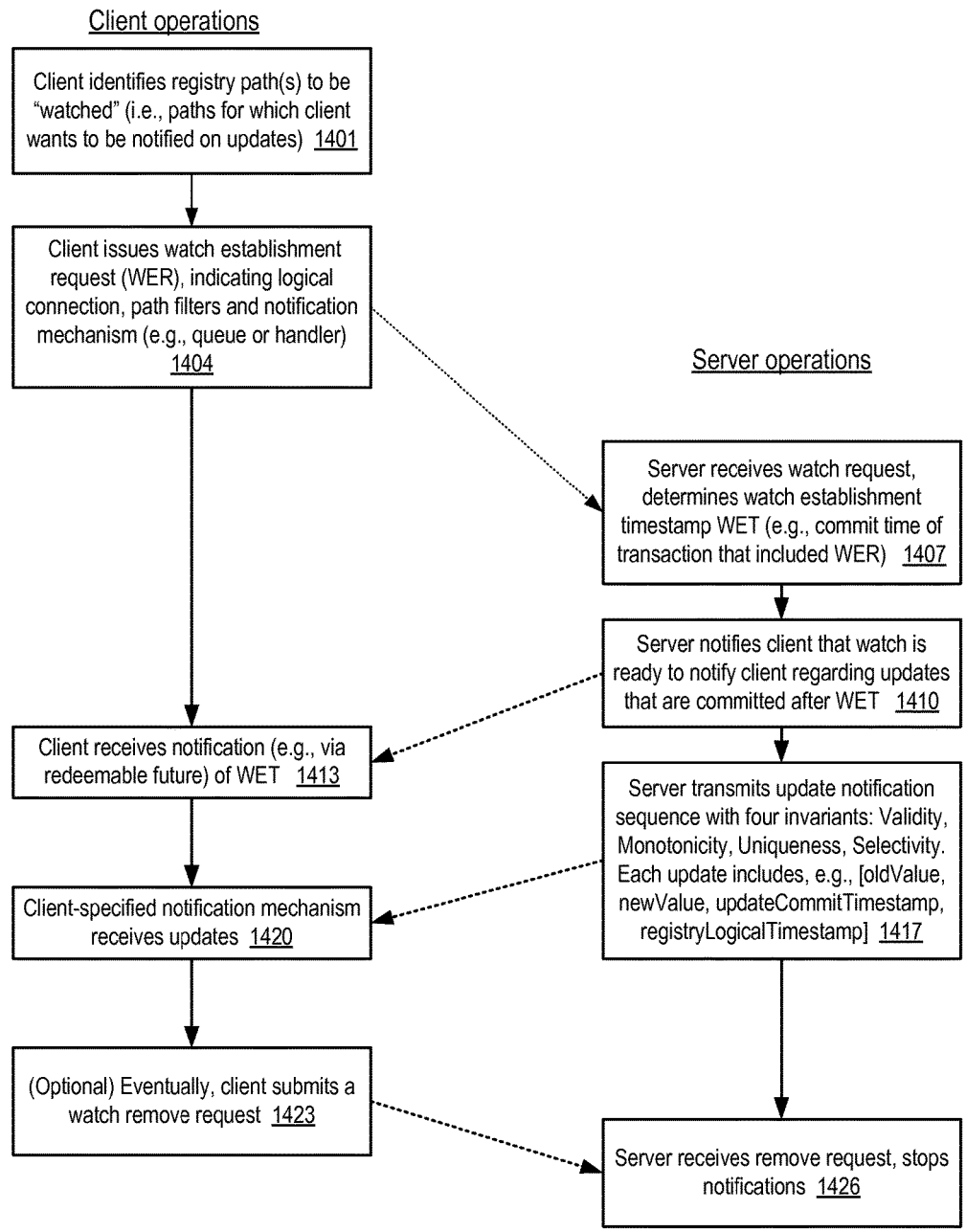
FIG. 14 illustrates example operations performed at a client process and a distributed state manager to set up a watch mechanism, according to at least some embodiments.

FIG. 14 illustrates example operations performed at a client process and a distributed state manager to set up a watch mechanism, according to at least some embodiments. The DSM operations are shown in the column labeled "server operations" in FIG. 14. As shown in element 1401 of FIG. 14, a client (e.g., a client process 105) may identify a set of registry elements to be watched (i.e., registry paths for which the client wishes to be notified when updates are committed), e.g., using a path filter construct as shown in the pseudo-code examples above. The client may issue a watch establishment request (WER), specifying the registry elements of interest, and the notification mechanism or destination (e.g., a handler or a queue) to be used for the updates (element 1404). The WER may be submitted as part of a transaction, or independently of a transaction, as determined by the client process 105. In some implementations, the WER may restrict the types of registry element types for which update notifications are desired—e.g., the request may indicate that only updates for sessions are desired, or only updates for locks are desired. Such restriction may help reduce the update processing overhead, by eliminating notifications for registry element types that are not of interest to the particular client application or use case.

A DSM server node 132 to which the client process has a connection established may receive the request (element 1407), and determine a watch establishment timestamp (WET), e.g., based on the commit DSM time of the transaction in the case where the watch was submitted as part of a transaction. The DSM collective may be involved in the determination of the WET, e.g., using a consensus based protocol as described with reference to FIGS. 1, 2 and 3. The DSM may then notify the client, e.g., by making a Future redeemable or some other asynchronous notification mechanism, that the watch is ready to submit notifications to the specified destination for any updates with commit times after the WET (element 1410). The client process may receive the notification (element 1413). The DSM may then start transmitting a sequence of update notifications to the destination, with the four invariants described earlier: validity, monotinicity, uniqueness and selectivity. The contents of each update notification may vary in different embodiments. In one embodiment, a given notification may include, for a given registry element, an old value, a new value, an update commit timestamp, and a DSM time of the node (e.g., the local copy of the registry logical timestamp at the node). In other embodiments, some subset of these values, such as the new value and the update commit timestamp, may be included in the notification. In some embodiments, a single notification may include information about changes to several registry elements, e.g., update notifications may be bundled together for several registry elements. The notification destination specified by the client in the WER may receive the sequence, and the client process may take appropriate actions (if any) in response to the notifications, as desired.

In some embodiments, clients may optionally stop the notifications by submitting a watch remove request (element 1423 of FIG. 14). In response to the watch remove request, the DSM may stop transmitting the update notifications (element 1426). In some embodiments, the filtering of updates may be performed at the DSM server node to which the client's connection that is being used for the watch is established; in other embodiments, some or all of the filtering may be performed at the client library component 115 being used by the client process 105. The guarantees regarding the four invariants associated with the watch mechanism may be enforced by logic implemented in the various DSM nodes 132. For example, for any given watch, in some implementations a corresponding thread of execution may be set up at one or more server nodes 132, configured to ensure that no duplicate notifications are sent, and that notifications are sent in the correct order. In some implementations, each watch may be restricted to communicating with a single client process; e.g., if two client processes wish to be notified of updates to the same set of registry paths, two independent watches may be set up.

Figure 15:
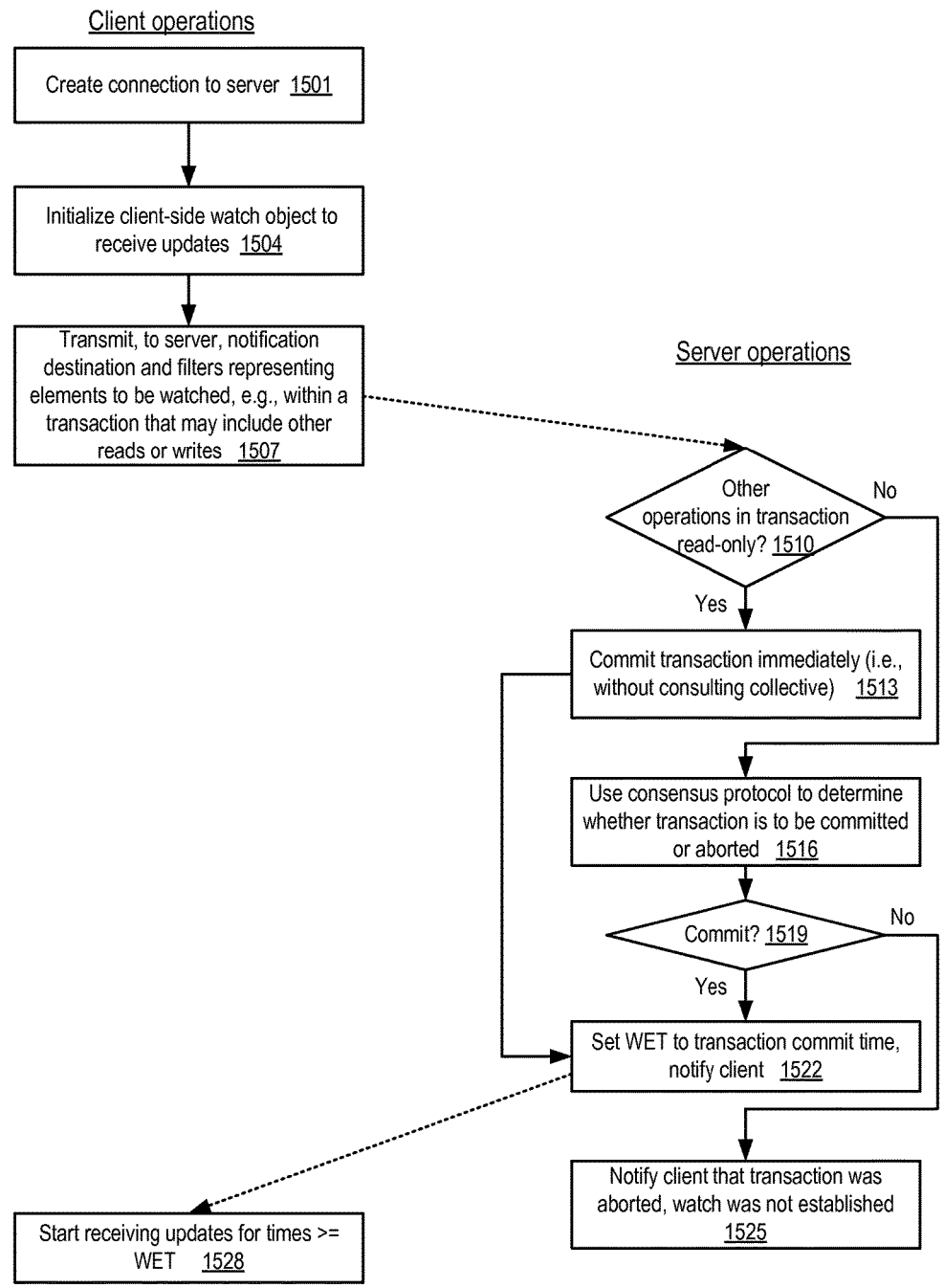
FIG. 15 illustrates example operations performed at a client process and a distributed state manager to set up a watch mechanism as part of a client-initiated transaction that includes at least one read operation or write operation, according to at least some embodiments.

FIG. 15 illustrates example operations performed at a client process and a distributed state manager to set up a watch mechanism as part of a client-initiated transaction that includes at least one read operation or write operation, according to at least some embodiments. As shown in element 1501, the client process may create a connection to the DSM, e.g., using a client library function that selects one of the DSM nodes 132. The client process may initialize a client-side watch object (element 1504) (e.g., the object returned from the createWatchOperation( ) method shown in pseudocode above). The client process may then transmit to the server node over the established connection, an indication of the desired notification destination, as well as filters representing the registry elements to be watched (element 1507). The filters may be submitted in a transaction together with one or more read or write operations, e.g., using transaction messages and stack-based transaction encoding as described above with reference to FIGS. 2 and 3.

The server may receive the transaction, parse it, and determine whether the other operations included are read-only or not (element 1510). If the other operations are read-only, the transaction may be committed by the receiving node 132, without consulting other nodes of the collective (element 1513). If there was at least one modifying operation in the transaction, a consensus-based protocol as discussed earlier may be used by the collective to determine whether to commit the transaction (element 1516). If the collective decides to abort the transaction or the transaction fails for some other reason, as determined in element 1519, the client may be notified that the transaction failed, and that the watch was not established (element 1525). If the transaction was committed, either by the receiving node alone in the case of read-only operations, or by the collective, the watch establishment timestamp may be set to the commit time of the transaction (element 1522). After the watch is established, the client may start receiving notifications for updates committed at or after the watch establishment time (element 1528).

Figure 16:
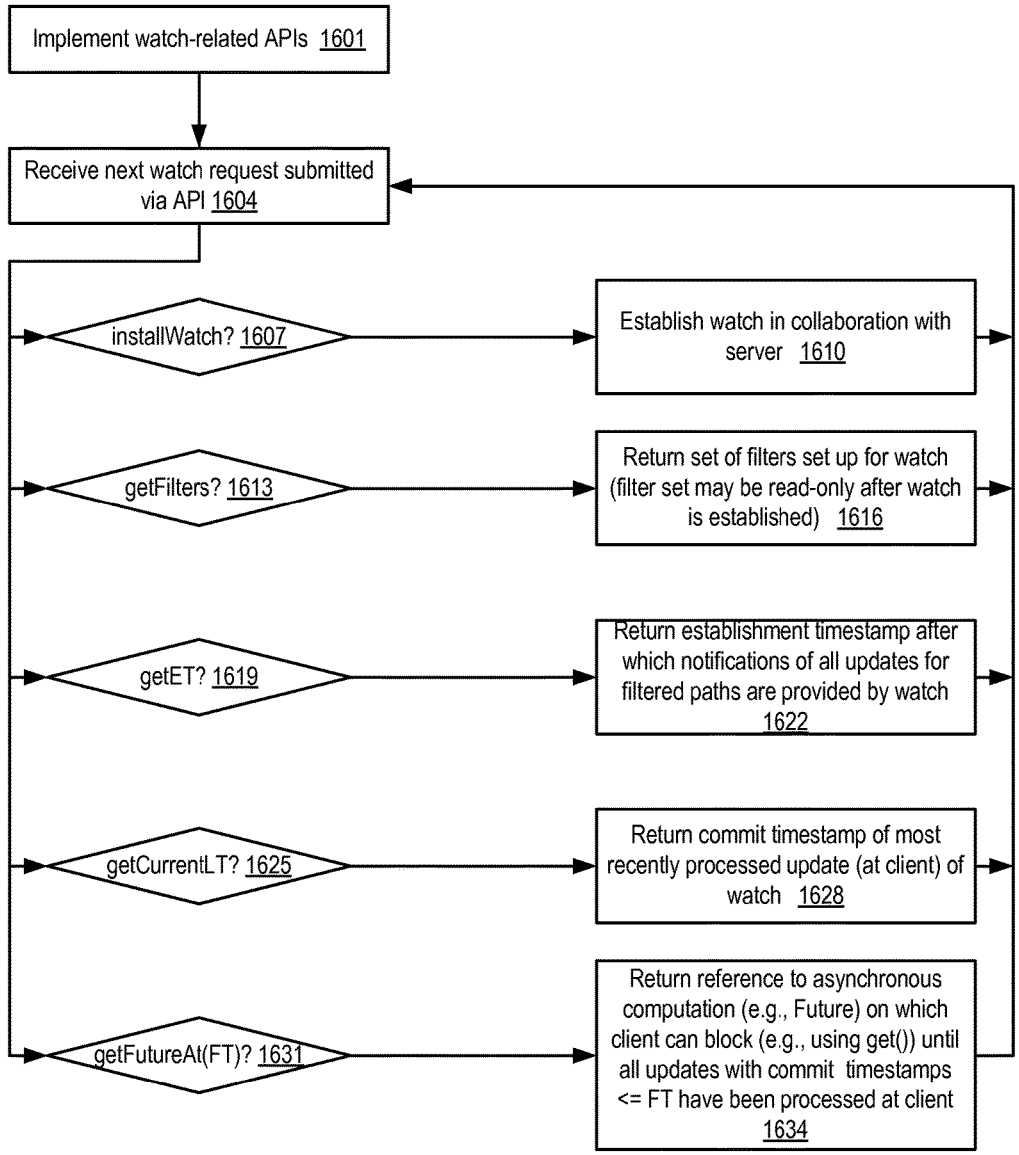
FIG. 16 illustrates aspects of the functionality of a distributed state manager supporting a number of watch-related programmatic interfaces, according to at least some embodiments.

FIG. 16 illustrates aspects of the functionality of a distributed state manager supporting a number of watch-related programmatic interfaces, according to at least some embodiments. As shown in element 1601, a number of watch-related APIs may be implemented by the DSM, and made available to client processes, e.g., via client libraries. Whenever a client submits a request via one of the APIs, the DSM (e.g., a client library component of the DSM) may receive the request (element 1604) and take one or more actions. Depending on the API, the actions may be taken entirely on the client side, e.g., by the DSM library components installed on the client devices and invoked by the client processes, or they may involve communication with a server node 132. If an "installWatch" API is invoked (element 1607), in the depicted embodiment a watch for the specified registry elements and notification destination may be established (element 1610), as described earlier. The installWatch API may be asynchronous at least in some embodiments, i.e., the client may have to issue a blocking request for its result (e.g., using installWatch.get( ) call as shown in the first watch-related pseudocode example above). In some embodiments several different APIs may be used to establish a watch, e.g., a transaction submitted with a client-side watch object as a parameter may be used instead of installWatch, as shown in the second watch-related pseudocode example above. In at least one embodiment, an installWatch API may include an indication of a specific type of registry element for which update notifications are desired (i.e., if the registry supports elements of types X, Y and Z, the installWatch request may specify that only updates to registry elements of type X with the specified paths are of interest, and notifications for other types of registry elements may not be sent to the client in such a scenario). In one embodiment, separate APIs may be implemented for establishing watches of each of the supported registry element types—e.g., installLockWatch, installEntryWatch, and installSessionWatch APIs may be implements if the registry supports element types Lock, Entry and Session.

In some embodiments, after a watch is created with a specified set of filters indicating the registry elements to be covered by the watch, the DSM may not allow the filters to be modified. Clients may be able to obtain the list of filters of a watch by invoking a getFilters API, as shown in elements 1613 and 1616. If a client submits a getEstablishmentTime API request (element 1619), the watch establishment timestamp may be returned in the depicted embodiment (element 1622), indicating the lower boundary on the update commit timestamps of the updates for which notifications are sent. Thus, if a client wishes to determine whether a watch it has set up covers an update that has a commit DSM timestamp T, the client may check whether the establishment time of the watch was less than or equal to T. If the watch establishment time was less than or equal to T, then the client may be assured that a notification of such an update would be provided to the notification destination set up for the watch.

In the depicted embodiment, a client may use a getCurrentLogicalTimestamp API (element 1625) to determine the timestamp of the most recent update notification that has been processed (e.g., by the client library component), as shown in element 1628. The getFutureAt API (element 1631) may be used by a client process to receive a reference to an asynchronous computation (e.g., a Future) on which the client process can block (e.g., using a Future.get( ) call) until updates with commit timestamps less than or equal to a specified value FT have been processed at the client, e.g., by the client library component. Such an API may be useful for a client process 105A to synchronize with another client process 105B in some embodiments. E.g., clients C1 and C2 could both set up watches for the same registry elements. If client C1 wants client C2 to wait until it has seen an update with a commit time of FT, C1 may send a message to C2, specifying the target time FT, and C2 may issue a blocking getFutureAt(FT).get( ) call to wait until C2's watch has processed all the updates with commit timestamps less than or equal to FT. After it has responded to any one of the illustrated APIs, the DSM may handle the next API call that is received (element 1604). At least in some embodiments, the DSM may be able to handle multiple API calls in parallel.

A number of different variants of the types of APIs shown in FIG. 16 may be implemented in different embodiments. In some embodiments, additional watch-related APIs beyond those shown in FIG. 16 may be implemented, including for example a remove API to discontinue or terminate a watch. The watch mechanism may be used to provide efficient implementations of the queue-for-lock functionality described earlier in at least one embodiment—e.g., a watch may be established on the lock for the requested path, so that updates to the lock state (e.g., changes in the size of the waiter queue) are transparently provided to the requesting client process. In at least some implementations, constructs similar to the Future constructs representing asynchronous computations described earlier may be used to implement portions of the watch mechanism.

Figure 17:
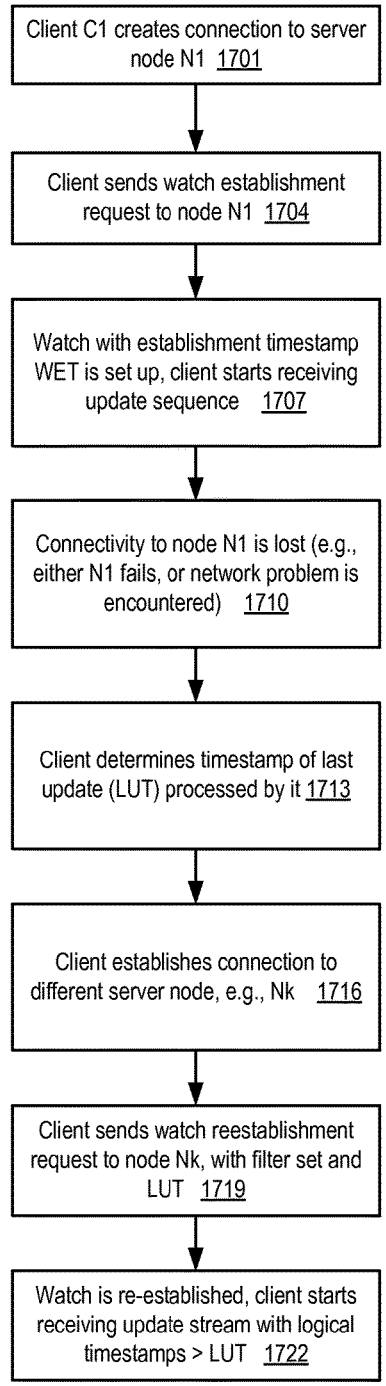
FIG. 17 illustrates example watch reestablishment operations that may be performed using a client library component of a distributed state manager, in response to a loss of connectivity with a server node of the distributed state manager, according to at least some embodiments.

FIG. 17 illustrates example watch reestablishment operations that may be performed using a client library component of a distributed state manager, in response to a loss of connectivity with a server node of the distributed state manager, according to at least some embodiments. As shown in element 1701, a client C1 (e.g., a client process 105) may create a connection to a DSM server node N1 for a watch. As mentioned earlier, the particular node N1 may be selected by a client library component at least in some embodiments. The client library may set up a logical connection object that encapsulates the underlying network connection in some embodiments; the details of the physical connection may not be revealed to the user code portion of the client application. The client may submit a watch establishment request over the connection, and a watch with an establishment time determined by the DSM may be set up in response. The client may begin receiving a sequence of update notifications (element 1707) as per the watch establishment request parameters.

At some later time, connectivity to node N1 may be lost (element 1710), e.g., either the node N1 may crash, or some network problem may be encountered. Using an API such as the getCurrentLogicalTimestamp API discussed above, the client (either the user code, or a library component) may determine the timestamp of the last update that was processed by the watch (i.e., at the client end of the connection) (element 1713). This last update timestamp (LUT) may be used to limit the number of updates received when the watch is reestablished, for example. The client library component may then choose another DSM server node Nk, and establish a connection to Nk (element 1716). The client may then submit a watch reestablishment request to node Nk, with the same set of filters as the original watch. In some embodiments, the watch reestablishment request may specify the last update timestamp in the watch reestablishment request (element 1719), so the node Nk can start providing updates starting after that timestamp (element 1722). In other embodiments, different responses to connectivity loss may be implemented than those shown in FIG. 17.

Versioned Read-Only Asynchronous Caches of Registry Elements

As noted earlier, many types of distributed client applications, such as applications that need to keep track of dynamically changing group membership or dynamically changing configuration information, may need to track state change information that is stored in the DSM registry. Using the watch mechanism described above, some client applications may implement their own custom caches that are updated as the watch-provided notifications arrive. In some embodiments, the DSM may provide a cache abstraction layer to further simplify the tasks that the client applications have to perform. For example, the DSM may provide client library components that implement, for a set of registry elements specified by a client process, a consistent, versioned, asynchronously updated read-only cache for the client process. In such embodiments, the client user code may not need to explicitly establish a watch, i.e., the watch used for the cache may be created by the client library component that implements the cache mechanism. Furthermore, the cache functionality supported by the DSM may also provide object type transformations in at least some embodiments. The DSM registry may only be configured to store objects of a few types in some embodiments—e.g., raw data entries (a sequence of bytes), locks, and sessions (which may contain information about DSM clients that are currently connected to the DSM). The client application may wish to use the registry to store more structured data of different types than supported by the registry, and to be able to read the data in the structured form from its cache. The cache mechanism supported by the DSM may allow the client user code to specify a transformation function to be used for converting the data stored in the registry (i.e., using the limited object types supported by the registry) into the object types of interest to the application (and at least in some embodiments, to transform user-defined objects into registry objects). The DSM may then configure the cache to automatically perform the type transformations, so that the client user code does not need to perform such transformations itself.

Figure 18:
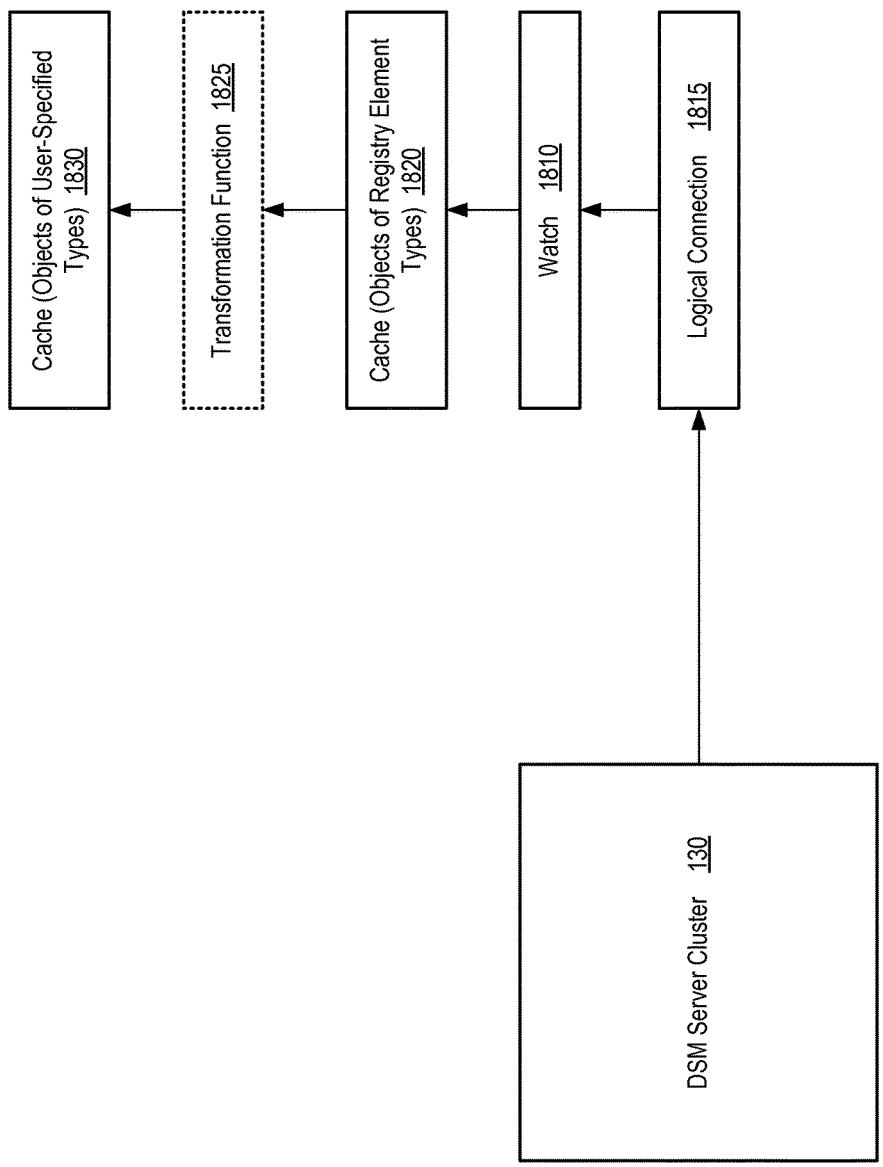
FIG. 18 illustrates underlying mechanisms that may be used by a distributed state manager to support a read-only versioned cache based on application state information stored in a state manager registry, according to at least some embodiments.

FIG. 18 illustrates underlying mechanisms that may be used by a distributed state manager to support a read-only cache based on application state information stored in a state manager registry, according to at least some embodiments. A client process may submit a cache setup request, e.g., using an API provided as part of a library component of the DSM. The cache setup request may, for example, include an indication of the set of registry elements that are to be cached, and a logical connection to 1815 to be used for the cache. In at least some implementations, the cache setup request may also include an indication of a transformation function 1825 for converting the registry elements into objects of the types of interest to the client application.

In response to the cache setup request, the DSM may establish a watch 1810 using the logical connection 1815. As described earlier, the logical connection may be established (e.g., by the client library component of the DSM) between the client process and some node 132 of the DSM server cluster 130, where the node may be selected based on different criteria or policies in different embodiments. For example, in some embodiments, the client library component may select a random node from among the currently-active nodes of the DSM server cluster, or the node to which it most recently established another connection, or the node to which it least recently established another connection. Once the watch is set up, a sequence of update notifications may be provided by the DSM server cluster to the client library, as described earlier, maintaining the invariants of validity, monotonicity, uniqueness, and selectivity. Each update notification may comprise an update timestamp (e.g., based on the registry logical timestamp corresponding to the commit of the update, where the commit itself may be determined based on a consensus-based protocol as described earlier). The client library may construct a cache 1820 comprising objects of the registry types using the update notifications. When the client user code submits a read request for some portion or all of the cache, the transformation function 1825 may be applied to the raw registry data to convert it to the desired type. In some implementations, the transformations may be applied prior to the read, e.g., as soon as the updates are received, i.e., in such implementations a cache 1830 of objects of the user-defined types may be maintained. In some implementations, a version number based on the latest update's timestamp may be maintained for the cache. In some embodiments the cache (e.g., either the cache 1820 of registry elements or the cache 1830 of user-specified types, or both) may be maintained in volatile memory, e.g., in the main memory of a computer system where the client process runs.

Figure 19:
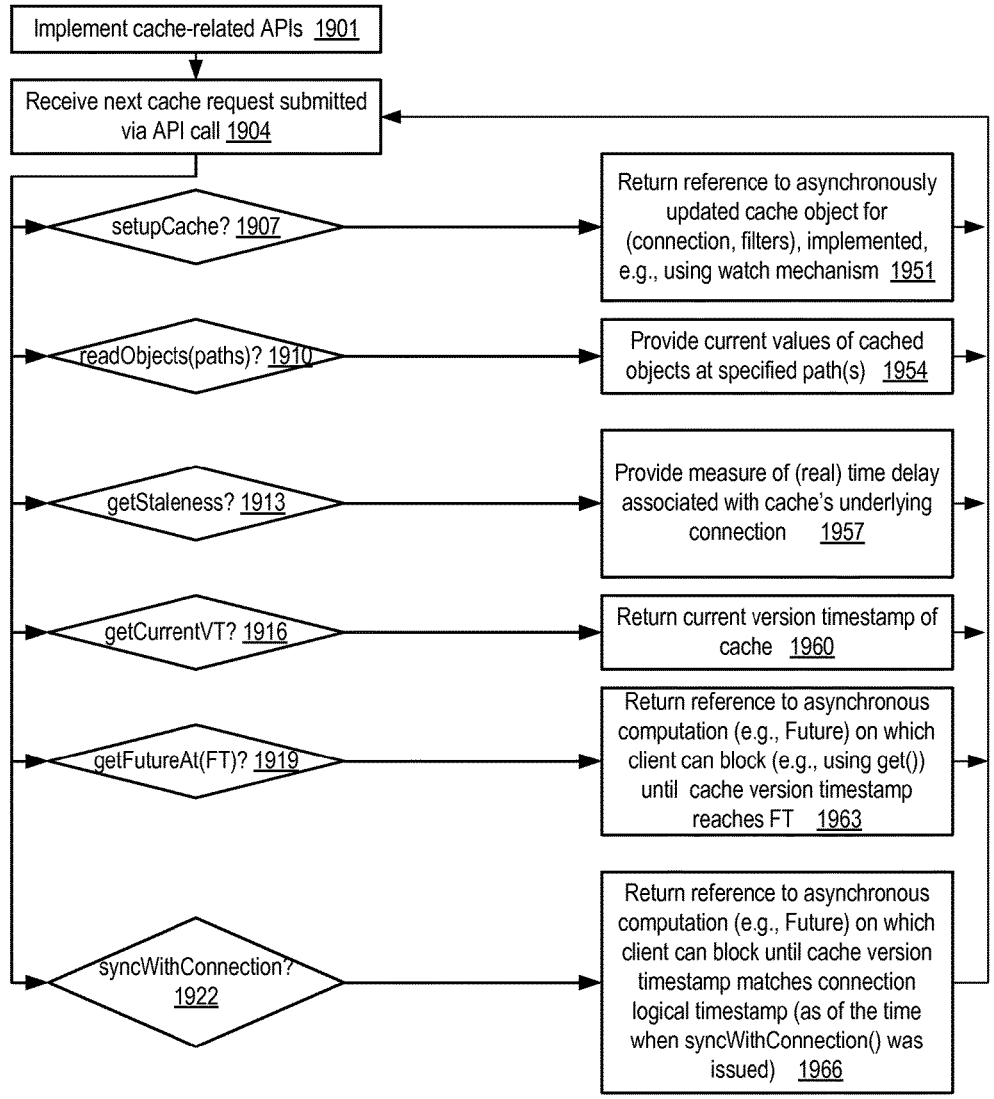
FIG. 19 illustrates aspects of the functionality of a distributed state manager supporting a number of cache-related programmatic interfaces, according to at least some embodiments.

FIG. 19 illustrates aspects of the functionality of a distributed state manager supporting a number of cache-related programmatic interfaces, according to at least some embodiments. As shown in element 1901, the DSM may implement a number of different programmatic interfaces such as cache APIs that may be made available to client applications via the DSM's client libraries. Depending on which one of the APIs is called or invoked by client user code (element 1904), the DSM may take corresponding actions.

For example, in response to a cache setup request (element 1907), the DSM may designate one or more elements of the registry as a cache data set, and provide to the client a reference to an asynchronously updated cache object comprising contents of the cache data set (element 1951). The client may be provided read-only access to the cache object, e.g., no write APIs to the cache may be implemented in some embodiments. The DSM may initiate a sequence of asynchronous update notifications to the cache object, where each asynchronous update notification includes updated contents of at least one element of the cache data set, and a cache version identifier based at least in part on a registry logical timestamp value indicative of a time at which the element was updated. The cache version identifier may also be referred to herein as the cache version timestamp.

In some embodiments, the DSM may provide several different cache setup APIs. For example, in one embodiment distinct cache setup APIs may be provided for several of the one or more registry element types. In one such embodiment, to set up a cache specifically for session registry elements stored under a registry directory with path "directoryPath", for example, a client may invoke an asynchronous API such as the following:
DSMDirectoryCache<DSMSession>cache=
DSMDirectoryCache.newSessionCache(connection, directoryPath).get( );

In the above example, the client process may block until the DSM server sets up the requested cache and the "get( )" call returns. All the elements of the registry whose paths start with the prefix indicated by "directoryPath" may form the cache data set in the example shown; for example, if new session entries are added to the registry within the same directory or one of its subdirectories, the new sessions may also be included in the cache. Similarly, an API such as the following may be invoked to set up a cache for lock objects stored under a registry directory path "directoryPath" in one embodiment:
DSMDirectoryCache<DSMLock>cache=
DSMDirectoryCache.newLockCache(connection, directoryPath).get( );

According to one embodiment, a third API may be invoked to set up a cache for arbitrary data registry entries whose contents are to be converted into objects of a type specified by the client. In the following example pseudocode, the client wishes to convert registry data entry contents, for entries stored under a registry directory with path "directoryPath", into the objects of type "Integer", and provides a transformation function "apply" to be used to implement the transformation.
1. // define transformation function to be used to convert registry entries to Integers
2. Function<DSMEntry, Integer>transformFunction=
3. new Function<DSMEntry, Integer>( ){
4. public Integer apply(DSMEntry input) {
5. return Integer.valueOf(input.value.toString( ));
6.}
7.};
8. // set up cache using newBuilder API, pass the transformation function as parameter
9. DSMDirectoryCache<Integer>cache=
10. DSMDirectoryCache.<Integer>newBuilder(connection, Integer, directoryPath)
11. .build(transformFunction).get( );

Returning to FIG. 19, a number of other APIs in addition to the cache setup APIs may be supported in the depicted embodiment. For example, once the cache has been set up, the client code may issue an API call to read a subset (or all) of the cache data set (element 1910 of FIG. 19), and in response may be provided the current values of the cached objects specified by the pathname(s) parameters of the API (element 1954). These read APIs may also be asynchronous and/or blocking calls in some implementations. A single read API may be used to obtain values of multiple elements of the cache data set in some embodiments.

In response to a getStaleness API call (element 1913), the DSM may provide a measure or estimate to the client of the time delay or lag (in real time) between the time that an event such as an update was committed at the DSM server, and the time that the update was processed at the client process (element 1957). The DSM may use the client heartbeats (illustrated by arrows 120 of FIG. 1) to estimate the lag or delay associated with the logical connection being used for the cache in some implementations. The client may obtain the current cache version identifier or version timestamp using a getCurrentVersionTimestamp API or a version query in some embodiments (element 1916).

In at least some embodiments, the client process may wish to wait or block until the cache version timestamp reaches some specified value (i.e., until some set of updates have been applied to the cache). A getFutureAt API, specifying the future timestamp FT, may be used (element 1919) for this purpose; in response, the DSM may provide a reference to an synchronous computation (e.g., a Future) on which the client process may block (e.g., using a Future.get( ) call) until the cache version timestamp reaches FT (element 1963). In at least some implementations, a timestamp may also be maintained for the underlying logical connection, indicating for example the most recent update that has been placed on the logical connection by a DSM server node. Since the client library receiving the notifications via the connection may take some time to process each update, at least at some points in time it may be possible that the cache version timestamp (which indicates the latest update available in the cache) may differ from the connection timestamp (which indicates the latest update sent by the DSM server) in such an implementation. A syncWithConnection API may be provided (element 1922) in one embodiment, allowing a client process to receive a reference to an asynchronous computation (e.g., a Future) on which the process may block (e.g., using a Future.get( ) call) or wait until the cache version timestamp catches up with the connection timestamp as of the time that the syncWithConnection call was issued (element 1966). For example, consider a scenario where monotonically increasing integer values are used as timestamps and versions, the cache version is 655665 when the syncWithConnection call is issued, and the logical connection timestamp is 655700 when the syncWithConnection call is issued. In such a scenario, the DSM may return a Future F1 to the client process, and if the client process then issues an F1.get( ) blocking call, F1.get( ) will return when the cache version reaches 655700. Note that by the time F1.get( ) returns in this example, the logical connection timestamp may have advanced further, e.g., to some value such as 655710, because more updates may have occurred in the interim. In the depicted embodiment, the DSM may turn its attention to the next API call as soon as it processes the current one (i.e., return to element 1904). Various other cache-related APIs, not shown in FIG. 19, may be implemented in some embodiments, and some of the illustrated APIs may not be implemented in some embodiments. A DSM may be able to respond to several cache API calls in parallel in at least some embodiments.

As noted earlier, the cache may be maintained in main memory (e.g., in heap storage of a Java™ virtual machine (JVM) being used for the client process) in some implementations. In some embodiments, when setting up the cache, the client may specify a maximum size of the cache (e.g., in the number of registry entries, or in absolute units such as megabytes), and/or an eviction or replacement policy to be used to decide which cache elements are to be discarded when the cache becomes full. For example, a least-recently-used policy may be specified for cache replacement. In other embodiments the DSM may not support replacement of cache entries—e.g., the entire cache data set may be retained in the cache. If the DSM cannot maintain the entire cache data set in memory, the client may be informed that the cache cannot be set up in some such embodiments. In at least some implementations, when the cache is initially set up, the entire cache data set may be loaded, which may take some time (e.g., tens of seconds, depending on the size of the cache data set). In at least some implementations, constructs similar to the Future constructs representing asynchronous computations described earlier may be used to implement portions of the cache mechanism.

Figure 20:
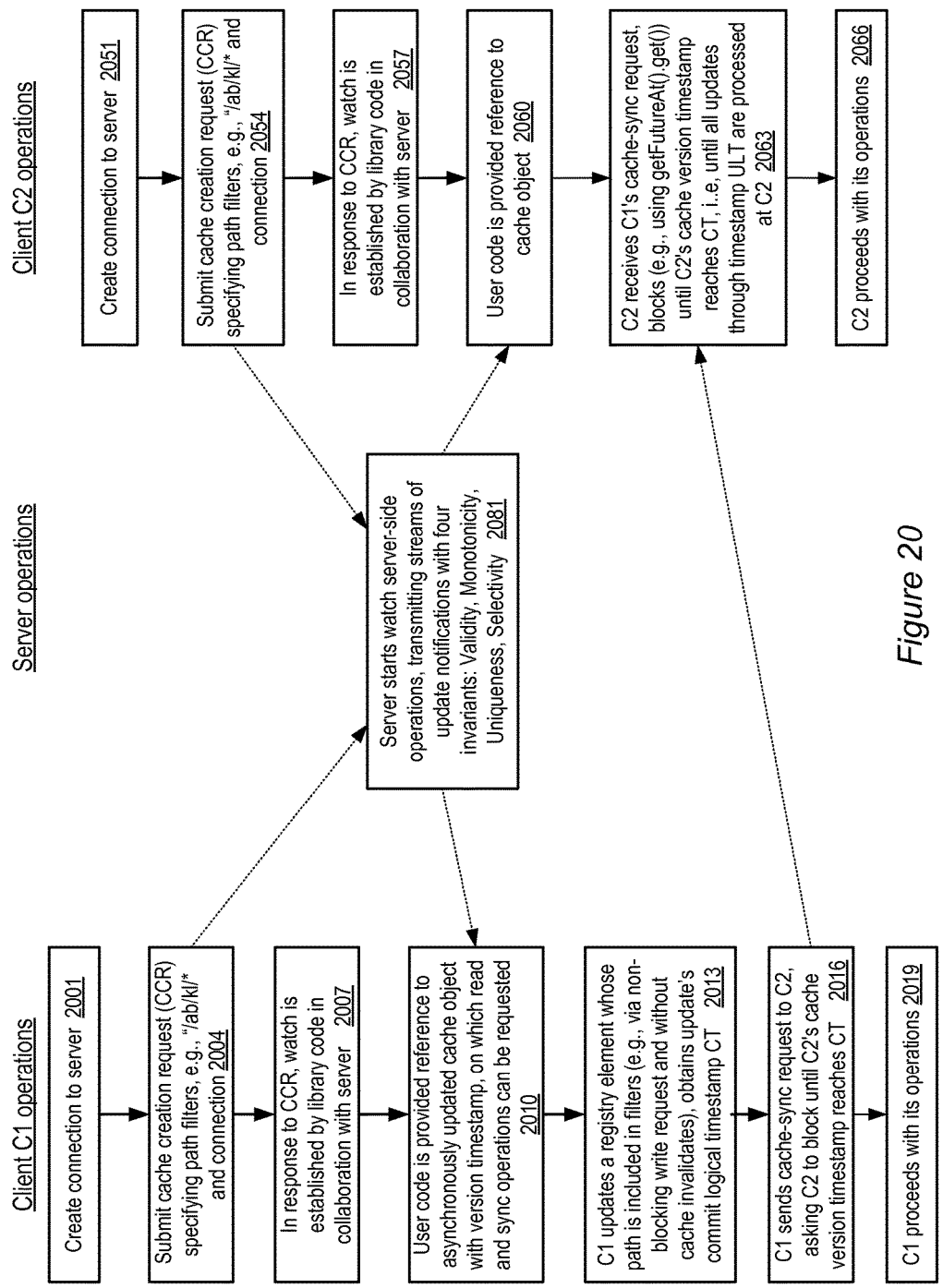
FIG. 20 illustrates examples of client operations by two client processes utilizing a read-only versioned cache mechanism supported by a distributed state manager, according to at least some embodiments.

FIG. 20 illustrates examples of client operations by two client processes utilizing a read-only versioned cache mechanism supported by a distributed state manager, according to at least some embodiments. As shown in elements 2001 and 2051, clients C1 and C2 (e.g., distinct client processes 105A and 105B of a distributed application) may set up respective connections to the DSM server. The two connections may be established to different server nodes in some implementations, and to the same node in other implementations, depending for example on the node selection policy in use by the client library components of the DSM. Each client process may submit a respective cache creation request specifying the same cache data set (e.g., using registry path names or filters), and the respective connection to be used (elements 2004 and 2054). The client library code and the DSM server node(s) may collectively set up the caches as requested for each of the client processes (elements 2007 and 2057), e.g., using a watch mechanism. The DSM server cluster may start the update notification sequences for the desired cache data set elements, maintaining the four invariants described above (validity, monotonicity, uniqueness, and selectivity) (element 2081). The client may be provided a reference to an asynchronously updated cache object with an associated cache version timestamp (elements 2010 and 2060) on which various APIs, including for example read APIs and synchronization APIs may be invoked. Each client process may then proceed to read cache entries as needed.

At some point in the illustrated example, client C1 may wish to update a registry element whose path is included in the cache data set. As shown in element 2013, C1 may update the element by issuing a non-blocking write request. As noted earlier, the cache itself may not be updated directly by the client (since it is a read-only cache). Instead, the client may submit the update to a DSM server node 132 as part of a transaction, as shown in FIG. 2 and FIG. 3. Unlike some other cache implementations, no cache invalidations may be required; instead, writes may be propagated to the various client processes as part of the update watch mechanism's notifications. Once the DSM collective has determined that the write is to be committed (e.g., as a result of a use of the consensus protocol discussed earlier), the value of that element may be communicated back to the client cache via the underlying watch, and C1 may learn the commit timestamp CT for that update.

C1 may wish to notify other client processes, such as C2, that the other client processes need to wait until they see the update in their caches. Accordingly, C1 may send a cache synchronization message to C2, asking C2 to wait until C2's cache version timestamp reaches CT (element 2016). C1 may then proceed to other operations, as desired (element 2019). Upon receiving the cache synchronization message (element 2063), C2 may block, e.g., using the equivalent of a blocking cache getFutureAt( ).get( ) method of the getFutureAt( ) API shown in FIG. 19, until its cache has received the update requested by C1. C2 may then proceed to other operations as desired (element 2066). In this way, different client processes may coordinate their work in some embodiments, ensuring for example that the same consistent view of shared state is seen before certain critical operations are performed at the various processes of the client application.

Figure 21:
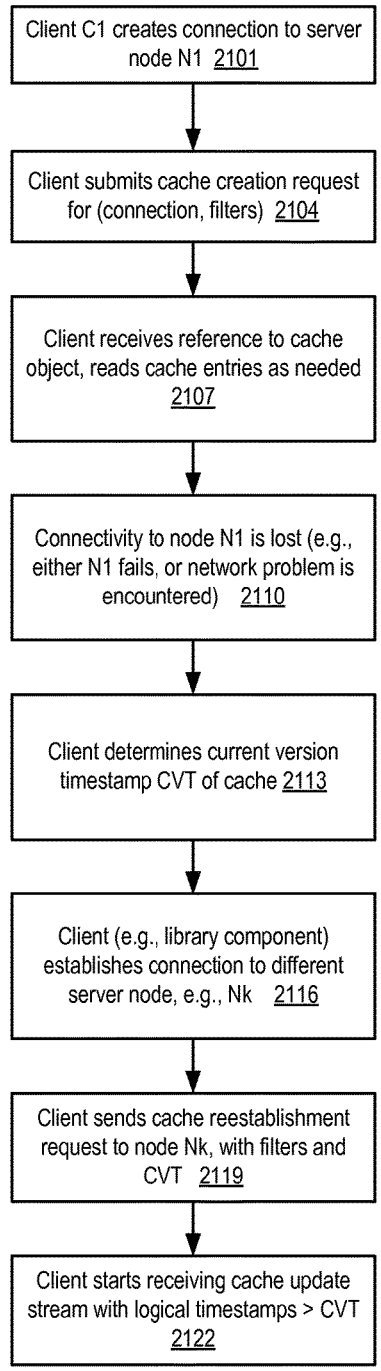
FIG. 21 illustrates example cache reestablishment operations that may be performed using a client library component of a distributed state manager, in response to a loss of connectivity with a server node of the distributed state manager, according to at least some embodiments.

FIG. 21 illustrates example cache reestablishment operations that may be performed using a client library component of a distributed state manager, in response to a loss of connectivity with a server node of the distributed state manager, according to at least some embodiments. As shown in element 2101, a client C1 (e.g., a client process 105) may establish a connection to a DSM server node N1. C1 may submit a cache setup request (element 2104), and obtain a reference to an asynchronously updated cache object with a version timestamp (element 2107).

If connectivity to N1 is lost, or N1 crashes (element 2110), in the depicted embodiment the latest cache version timestamp (CVT) may be determined at C1 (either the user code or the client library component may determine CVT in various embodiments) (element 2113). A connection to a different server node Nk may then be established (element 2116), e.g., automatically by the client library. A cache reestablishment message may then be sent to Nk (element 2119), indicating the latest cache version timestamp CVT seen at the client before N1 became unreachable. Providing the CVT may help the node Nk reduce the number of update notifications it has to send. Once the cache is reestablished, C1 may start receiving updates with commit timestamps later than CVT (element 2122).

Use Cases

The techniques described above, of supporting various types of asynchronous, idempotent and queue-depth limited locking mechanism, transactional watches, and versioned read-only caches, may be very useful in a number of different scenarios. The queue-for-lock mechanism, for example, may allow cleaner implementation of distributed applications, so that application writers can be assured that their lock release or cancel requests are handled safely. Idempotent versions of lock and queue-for-lock requests may also lead to simpler and cleaner application code, in that clients may be able to avoid having to handle certain types of exceptions or errors. Maximum queue depths for locks may allow application designers to distribute work more effectively. For example, in some applications each lock may protect a stream of incoming tasks of a certain type, and the designers may wish to ensure that no more than X worker processes are dedicated to handling jobs of type Y. If, in such a scenario, a particular worker process fails to acquire a lock for task type Y because the lock's wait queue is full, this may mean that enough worker processes are already assigned for tasks of type Y.

Watches, and read-only caches that rely on watches, may be used for a number of different types of applications. Client applications that need to have a consistent view of configuration metadata, such as the mappings of storage object unique identifiers (or keys) to underlying storage locations or addresses, may be helped substantially by the use of such mechanisms. Registry entries may, for example, store metadata such as (object key, physical storage location) for various storage objects. And such metadata may be cached at the various servers of a storage service to which customers of the storage service may send reads and writes. In another application, a range of values representing resource identifiers of resources to be leased to customers by a set of lease managers may be dynamically redistributed among various lease manager servers. The number of active lease manager servers may change over time. If the lease application intends that no more than one lease manager is to be designated for a particular resource identifier, each lease manager may wish to retain a consistent view of the mapping between the range of resource identifiers and the set of active lease managers. Similarly, in a software test environment, a DSM registry may be used to maintain information about tested configurations. Whenever a new test configuration is added, some action may need to be taken, so the watch mechanism may be used in such an application, e.g., to avoid the need for polling.

Illustrative Computer System

Figure 22:
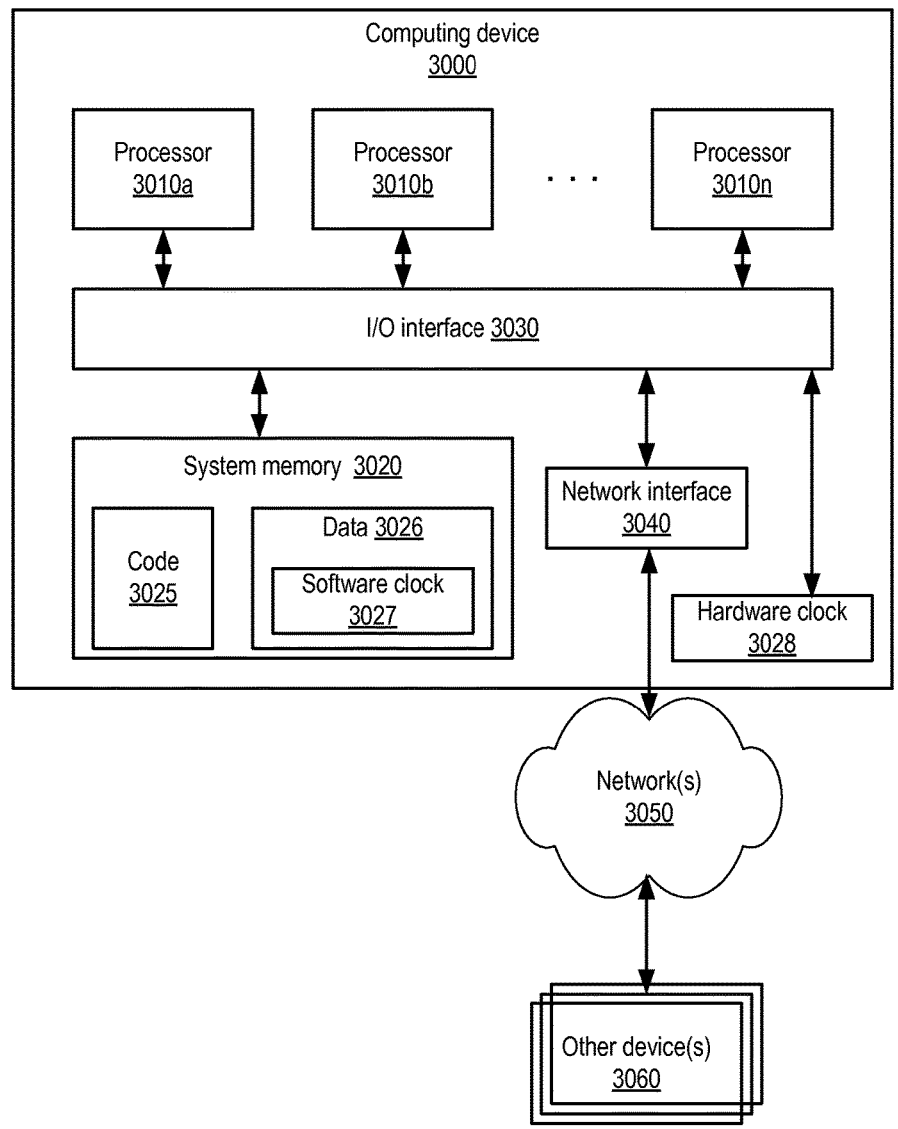
FIG. 22 is a block diagram illustrating an example computing device that may be used in some embodiments.

In at least some embodiments, a server that implements a portion or all of one or more of the technologies described herein, including the functionality of the various server nodes of the DSM, the client library components of the DSM, and user components of client processes, may include a general-purpose computer system that includes or is configured to access one or more computer-accessible media. FIG. 22 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions (e.g., code 3025) and data 3026 accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026. In at least some embodiments one or more software clocks 3027 may be maintained, e.g., as a respective logical timestamp associated with one or more logical entities such as the caches, watch mechanisms, connections, registries and the like described above. In some embodiments a software clock 3027 may simply be implemented as a 64-bit number that is incremented when the state of the corresponding entity (such as a cache maintained at a client) changes.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010. Computing device 3000 may include one or more hardware clocks 3028 in some embodiments, output from which may be used to determine a time-of-day for the computing device as a whole, to generate timestamps or software clock values, and so on.

Network interface 3040 may be configured to allow data to be exchanged between computing device 3000 and other devices 3060 attached to a network or networks 3050, such as other computer systems or devices as illustrated in FIGS. 1 through 21, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 21 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 22 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed system, comprising:
   a plurality of computing devices comprising one or more processors and memory to implement a state manager of a distributed computing application including a plurality of client processes, wherein the state manager comprises a plurality of server nodes configured to coordinate access to a registry comprising a representation of a state of the distributed computing application;
   wherein the state manager is configured to:
      implement a set of programmatic interfaces, accessible to a client process of the plurality of client processes, defining operations associated with a read-only cache of registry elements to be maintained on behalf of the client process;
      in response to a cache setup request from a particular client process of the plurality of client processes, formatted in accordance with an interface of the set of programmatic interfaces,
         designate one or more elements of the registry as a cache data set, wherein the cache setup request identifies the one or more elements of the registry;
         provide, to the particular client process, a reference to an asynchronously updated cache object comprising contents of the cache data set, wherein the particular client process is provided read-only access to the cache object; and
         initiate a sequence of asynchronous update notifications to the cache object, wherein each asynchronous update notification includes (a) updated contents of an element of the cache data set, and (b) a cache version identifier based at least in part on a registry logical timestamp value indicative of a time at which the element was updated; and
      in response to a block request from the particular client process comprising a future timestamp, provide, to the particular client process, a reference to a synchronous computation, wherein the synchronous computation is blocked until the cache version identifier corresponds to the future timestamp.

2. The distributed system as recited in claim 1, wherein the state manager is further configured to:
   prior to providing contents of a particular element of the cache data set in response to a read request from the particular client process, apply an object type transformation function to the particular element, wherein the object type transformation function is indicated in the cache setup request.

3. The distributed system as recited in claim 1, wherein the registry is configured to store elements of a plurality of element types, including a first element type and a second element type, wherein the set of programmatic interfaces comprises a first cache setup programmatic interface to establish a cache restricted to elements of the first element type, and a second cache setup programmatic interface to establish a cache restricted to elements of the second element type.

4. The distributed system as recited in claim 1, wherein the state manager is further configured to:
   provide, in response to a single read request for the cache data set, contents of a plurality of elements of the cache data set associated with a particular version identifier of the cache object.

5. The distributed system as recited in claim 1, wherein the cache version identifier comprises a monotonically increasing numerical value, wherein the state manager is further configured to:
   provide, in response to a request specifying a target minimum version identifier numerical value, a notification when the numerical value of the cache version identifier equals the target minimum version identifier.

6. The distributed system as recited in claim 1, wherein the state manager is further configured to:
   in response to a non-blocking update request from the particular client process, the update request specifying an element of the registry included in the cache data set,
      receive the update request at a particular node of the plurality of nodes;
      determine, using a consensus-based protocol, whether to commit a transaction to modify the registry in accordance with the update request, and
      generate an update notification for the cache object after determining to commit the transaction.

7. A method, comprising:
   implementing, using a plurality of computing devices, a state manager of a distributed computing application comprising a plurality of client processes, wherein the state manager comprises a plurality of server nodes configured to coordinate access to a registry comprising a representation of a state of the distributed computing application;
   in response to a cache setup request from a particular client process of the plurality of client processes,
      designating one or more elements of the registry as a cache data set, wherein the cache setup request identifies the one or more elements of the registry;
      providing, to the particular client process, a reference to an asynchronously updated cache object comprising contents of the cache data set, wherein the particular client process is provided read-only access to the cache object; and
      initiating, from the state manager, a sequence of asynchronous update notifications to the cache object, wherein each asynchronous update notification includes (a) updated contents of an element of the cache data set, and (b) a cache version identifier based at least in part on a registry logical timestamp value indicative of a time at which the element was updated; and
   in response to a block request from the particular client process comprising a future timestamp, provide, to the particular client process, a reference to a synchronous computation, wherein the synchronous computation is blocked until the cache version identifier corresponds to the future timestamp.

8. The method as recited in claim 7, further comprising:
implementing a set of programmatic interfaces allowing the particular client process to access cached contents of the cache data set.

9. The method as recited in claim 7, further comprising:
providing, in response to a single read request for the cache data set, contents of a plurality of elements of the cache data set associated with a particular version identifier of the cache object.

10. The method as recited in claim 7, further comprising:
providing, in response to a cache version query, a version identifier associated with the latest asynchronous update notification received for the cache object.

11. The method as recited in claim 7, wherein the cache version identifier comprises a monotonically increasing numerical value, further comprising:
providing, in response to a request specifying a target minimum version identifier numerical value, a notification when the numerical value of the cache version identifier equals the target minimum version identifier.

12. The method as recited in claim 7, further comprising:
providing, to the particular client process, a timestamp value of a logical connection established between the particular client process and a particular node of the plurality of nodes, wherein the timestamp value is indicative of the latest update notification transmitted to the logical connection from the particular node.

13. The method as recited in claim 12, further comprising:
providing, in response to a connection synchronization request from the particular client process, wherein the connection synchronization request is received when the timestamp value of the logical connection has a particular value, a notification when the cache version identifier equals the particular value.

14. The method as recited in claim 7, wherein each of the one or more elements of the cache data set is identified in the cache setup request by a respective identifier formatted as a path name comprising a set of concatenated strings beginning with a root directory name within a namespace associated with the registry, further comprising:
in response to a creation of an additional element of the registry with a particular path name, wherein the particular path name comprises a concatenation of an additional string to a path name of an element previously included in the cache data set, adding the additional element to the cache data set.

15. The method as recited in claim 7, wherein the distributed computing application comprises a distributed storage service in which a physical location of a storage object is determined at least in part by a unique key value associated with the storage object, wherein the cache data set comprises metadata records for the distributed storage service, and wherein a particular element of the cache data set comprises at least one key value of a particular storage object and an indication of the physical location of the particular storage object.

16. The method as recited in claim 7, wherein the distributed computing application comprises a plurality of worker processes, wherein the cache data set comprises a plurality of session records for the plurality of worker processes, wherein a particular session record of the plurality of session records comprises an indication of a state of a particular worker process of the plurality of worker processes.

17. A non-transitory computer-accessible storage medium storing program instructions that when executed on a plurality of processors implement:
a state manager of a distributed computing application including a plurality of client processes, wherein the state manager comprises a plurality of server nodes configured to coordinate access to a registry comprising a representation of a state of the distributed computing application;
wherein the state manager is configured to:
in response to a cache setup request from a particular client process of the plurality of client processes,
designate one or more elements of the registry as a cache data set, wherein the cache setup request identifies the one or more elements of the registry, and
provide, to the particular client process, a reference to an asynchronously updated cache object comprising contents of the cache data set; and
initiate a sequence of asynchronous update notifications, wherein each asynchronous update notification includes (a) updated contents of an element of the cache data set, and (b) a cache version number based at least in part on a registry logical timestamp value indicative of a time at which the element was updated; and
in response to a block request from the particular client process comprising a future timestamp, provide, to the particular client process, a reference to a synchronous computation, wherein the synchronous computation is blocked until the cache version identifier corresponds to the future timestamp.

18. The storage medium as recited in claim 17, wherein the state manager is further configured to:
in response to the cache setup request from the particular client process, establish, at the plurality of server nodes, a cache for the particular client process based at least in part on the cache data set.

19. The storage medium as recited in claim 17, wherein the registry is configured to store elements of a plurality of element types, including a first element type and a second element type, wherein the instructions when executed on the one or more processors cause the one or more processors to:
implement a set of programmatic interfaces comprising a first cache setup programmatic interface to establish a cache restricted to elements of the first element type, and a second cache setup programmatic interface to establish a cache restricted to elements of the second element type.

20. The storage medium as recited in claim 17, wherein the state manager is further configured to:
provide, in response to a single read request for the cache data set, contents of a plurality of elements of the cache data set associated with a particular version identifier of the cache object.

21. The storage medium as recited in claim 17, wherein the cache version identifier comprises a monotonically increasing numerical value, wherein the state manager is further configured to:
provide to the particular client process, in response to a request specifying a target minimum version identifier numerical value, a notification when the numerical value of the cache version identifier equals the target minimum version identifier.

22. The storage medium as recited in claim 17, wherein the state manager is further configured to:

in response to a non-blocking update request from the particular client process, specifying an element of the registry included in the cache data set, receive the update request at a particular node of the plurality of nodes;

determine, using a consensus-based protocol, whether to commit a transaction to modify the registry in accordance with the update request, and generate an update notification for the cache object after determining to commit the transaction.

23. The storage medium as recited in claim 17, wherein the state manager is further configured to:

in response to the cache setup request, prior to providing to the particular client process a reference to an asynchronously updated cache object, instantiate a watch mechanism to provide the sequence of asynchronous update notifications.

\* \* \* \* \*